United States Patent
Cooper et al.

(10) Patent No.: US 12,198,183 B1
(45) Date of Patent: Jan. 14, 2025

(54) DYNAMIC MEDIA-PRODUCT SEARCHING PLATFORM APPARATUSES, METHODS AND SYSTEMS

(71) Applicant: Painted Dog, Inc., New York, NY (US)

(72) Inventors: Tyler Harrison Cooper, Brooklyn, NY (US); Vincent Alexander Crossley, New York, NY (US); Jared Max Browarnik, New York, NY (US)

(73) Assignee: Painted Dog, Inc., New York, NY (US)

(*) Notice: Subject to any disclaimer, the term of this patent is extended or adjusted under 35 U.S.C. 154(b) by 182 days.

(21) Appl. No.: 16/929,192

(22) Filed: Jul. 15, 2020

Related U.S. Application Data

(63) Continuation of application No. 14/527,854, filed on Oct. 30, 2014, now Pat. No. 10,748,206.

(60) Provisional application No. 61/943,182, filed on Feb. 21, 2014.

(51) Int. Cl.
  *G06Q 30/0601* (2023.01)
  *G06F 16/58* (2019.01)
  *G06Q 20/12* (2012.01)

(52) U.S. Cl.
  CPC ..... *G06Q 30/0643* (2013.01); *G06F 16/5866* (2019.01); *G06Q 20/12* (2013.01)

(58) Field of Classification Search
  CPC .......... G06Q 30/0643; G06F 16/5866
  See application file for complete search history.

(56) References Cited

U.S. PATENT DOCUMENTS

| | | | |
|---|---|---|---|
| 7,840,415 B2 | 11/2010 | Schifone | |
| 7,987,098 B2 | 7/2011 | Schifone | |
| 8,312,486 B1 | 11/2012 | Briggs et al. | |
| 8,458,053 B1 | 6/2013 | Buron et al. | |
| 8,533,753 B2 | 9/2013 | Briggs et al. | |
| 8,549,555 B2 | 10/2013 | Briggs et al. | |

(Continued)

FOREIGN PATENT DOCUMENTS

| | | |
|---|---|---|
| WO | 2015048377 A1 | 4/2015 |
| WO | 2015054644 A1 | 4/2015 |

(Continued)

OTHER PUBLICATIONS

Digital Ingenuity Systems aims to help video content providers enhance monetisation potential. TECHCiRCLE HT Digital Streams Limited. (Jun. 5, 2013) (Year: 2013).*

(Continued)

*Primary Examiner* — Michael Misiaszek
(74) *Attorney, Agent, or Firm* — Smith Baluch LLP

(57) ABSTRACT

A dynamic media-product searching platform (DMPSP) transforms media source, product, and user inputs into product metadata and transactions outputs. In some implementations, the DMPSP may receive an indication that a user is interacting with a media source, provide a product overlay to the user indicating products within the media source available for purchase, receive from the user a selection of a product, send product information to the user via the product overlay, receive from the user an indication of interest in purchasing the product, and process a transaction for the user to purchase the product.

20 Claims, 26 Drawing Sheets

(56) References Cited

U.S. PATENT DOCUMENTS

| | | | |
|---|---|---|---|
| 8,682,739 B1* | 3/2014 | Feinstein | G06Q 30/06 |
| | | | 705/26.1 |
| 8,769,053 B2 | 7/2014 | Spitz et al. | |
| 8,782,690 B2 | 7/2014 | Briggs et al. | |
| 8,813,132 B2 | 8/2014 | Andrews et al. | |
| 9,210,472 B2* | 12/2015 | Andrews, II | H04N 21/2547 |
| 9,338,500 B2 | 5/2016 | Briggs et al. | |
| 9,344,754 B2 | 5/2016 | Briggs et al. | |
| 9,351,032 B2 | 5/2016 | Briggs et al. | |
| 9,451,010 B2 | 9/2016 | Spitz et al. | |
| 9,607,330 B2 | 3/2017 | Spitz et al. | |
| 9,674,584 B2 | 6/2017 | Briggs et al. | |
| 9,697,504 B2 | 7/2017 | Spitz et al. | |
| 9,813,770 B2 | 11/2017 | Andrews et al. | |
| 9,875,489 B2 | 1/2018 | Spitz et al. | |
| 9,953,347 B2 | 4/2018 | Spitz et al. | |
| RE46,865 E | 5/2018 | Schifone | |
| 9,986,305 B2 | 5/2018 | Briggs et al. | |
| 10,225,614 B2 | 3/2019 | Andrews et al. | |
| 10,748,206 B1 | 8/2020 | Cooper et al. | |
| 2003/0188313 A1* | 10/2003 | Ellis | H04N 21/84 |
| | | | 348/E7.071 |
| 2006/0251292 A1 | 11/2006 | Gokturk et al. | |
| 2008/0168055 A1 | 7/2008 | Rinearson et al. | |
| 2010/0042469 A1* | 2/2010 | Chandrasekar | G06Q 30/0256 |
| | | | 705/14.1 |
| 2010/0082653 A1 | 4/2010 | Nair | |
| 2010/0153831 A1* | 6/2010 | Beaton | G06Q 30/02 |
| | | | 715/201 |
| 2010/0281373 A1 | 11/2010 | Pueyo et al. | |
| 2011/0016487 A1 | 1/2011 | Chalozin et al. | |
| 2011/0126252 A1* | 5/2011 | Roberts | H04N 21/4788 |
| | | | 725/114 |
| 2011/0137753 A1 | 6/2011 | Moehrle | |
| 2011/0162002 A1* | 6/2011 | Jones | G06Q 30/0241 |
| | | | 725/32 |
| 2012/0233641 A1* | 9/2012 | Gambino | H04N 21/4725 |
| | | | 725/60 |
| 2012/0296782 A1* | 11/2012 | Tsai | G06Q 10/08 |
| | | | 705/28 |
| 2013/0019268 A1 | 1/2013 | Fitzsimmons et al. | |
| 2013/0039547 A1 | 2/2013 | Liu et al. | |
| 2013/0144727 A1* | 6/2013 | Morot-Gaudry | G06Q 30/06 |
| | | | 725/32 |
| 2014/0105508 A1* | 4/2014 | Arora | G06V 30/262 |
| | | | 382/218 |
| 2014/0140680 A1 | 5/2014 | Jo | |
| 2014/0150029 A1* | 5/2014 | Avedissian | G06Q 30/0261 |
| | | | 725/60 |
| 2016/0191981 A1 | 6/2016 | Briggs et al. | |
| 2016/0191982 A1 | 6/2016 | Briggs et al. | |
| 2016/0191983 A1 | 6/2016 | Briggs et al. | |
| 2016/0191984 A1 | 6/2016 | Briggs et al. | |
| 2016/0192015 A1 | 6/2016 | Briggs et al. | |
| 2016/0192031 A1 | 6/2016 | Briggs et al. | |
| 2016/0196264 A1 | 7/2016 | Bostick et al. | |
| 2017/0134779 A9 | 5/2017 | Briggs et al. | |
| 2017/0195400 A1 | 7/2017 | Spitz et al. | |
| 2017/0301003 A1 | 10/2017 | Spitz et al. | |
| 2018/0018724 A1 | 1/2018 | Spitz et al. | |
| 2018/0077466 A1 | 3/2018 | Briggs et al. | |
| 2018/0107993 A1 | 4/2018 | Spitz et al. | |
| 2018/0240159 A9 | 8/2018 | Briggs et al. | |
| 2018/0249217 A1 | 8/2018 | Andrews et al. | |
| 2018/0308131 A1 | 10/2018 | Spitz et al. | |
| 2018/0338188 A1 | 11/2018 | Briggs et al. | |
| 2019/0095955 A1 | 3/2019 | Spitz et al. | |
| 2019/0147502 A1 | 5/2019 | Briggs et al. | |

FOREIGN PATENT DOCUMENTS

| | | |
|---|---|---|
| WO | 2015138612 A1 | 9/2015 |
| WO | 2016109810 A1 | 7/2016 |

OTHER PUBLICATIONS

Digitalsmiths Wins Streaming Media Readers' Choice Award for Search and Indexing Platform. Business Wire Sep. 26, 2008: NA. (Year: 2008).*

Law, "The theory of interactive content-triggered consumer action: Interactive content theory." (2001): 4089-4089.

Scansaroli, "Interactive retailing: Present and future scenarios." Chain Store Age 73.1 (Jan. 1997): 14A-17A.

The theory of interactive content-triggered consumer action: Interactive content theory. Law, Chun Wah Eric. Hong Kong University of Science and Technology (Hong Kong), ProQuest Dissertations Publishing, 2000. 9991505. (Year: 2000).

Unpublished U.S. Appl. No. 16/409,144, filed May 10, 2019.

* cited by examiner

DYNAMIC MEDIA-PRODUCT SEARCHING PLATFORM APPARATUSES, METHODS AND SYSTEMS

CROSS-REFERENCE TO RELATED APPLICATIONS

This application is a continuation of U.S. application Ser. No. 14/527,854, filed on Oct. 30, 2014, which in turn claims the priority benefit, under 35 U.S.C. 119 (e), of U.S. Application No. 61/943,182, filed on Feb. 21, 2014. Each of these applications is incorporated by reference in its entirety.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address media analysis and purchase transactions, and more particularly, include dynamic media-product searching platform (DMPSP) apparatuses, methods and systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computers may be utilized to facilitate numerous ecommerce functions. Consumers may use computers to purchase goods and services from merchants.

BRIEF DESCRIPTION OF THE DRAWINGS

The accompanying appendices and/or drawings illustrate various non-limiting, example, innovative aspects in accordance with the present descriptions.

Figure 1:
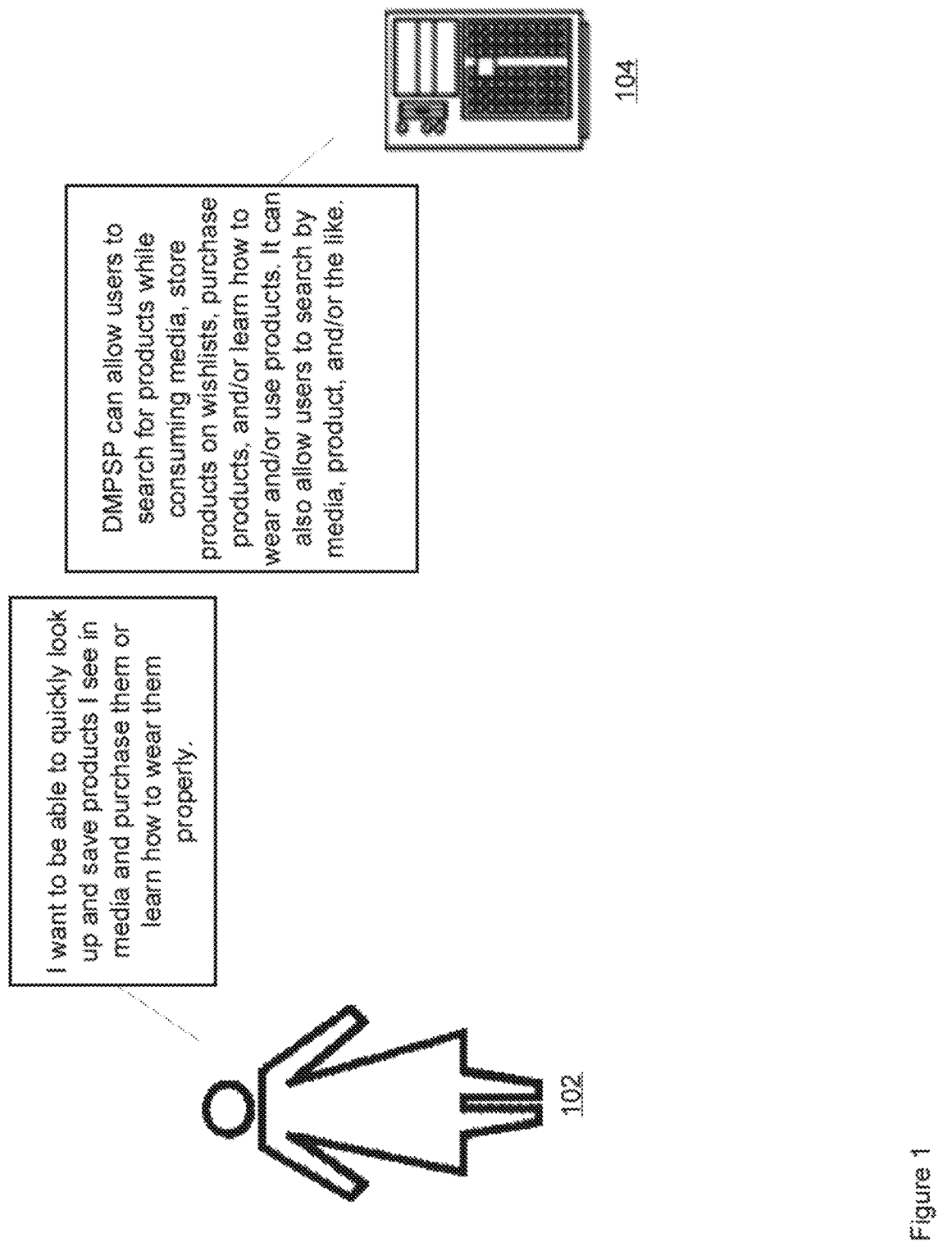
FIG. 1 shows a block diagram illustrating example embodiments of the DMPSP.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

In some implementations, the DMPSP can be used to identify and find products and locations from media, e.g., films, television shows, music videos, magazines, advertisements, trailers, and/or the like). The DMPSP may provide a graphical user interface module, e.g., a web application interface (e.g., a website in a web browser, a web-enabled mobile application, a web-enabled application on an augmented and/or virtual reality device, e.g., Google Glass and/or Oculus Rift, and/or the like), e.g., which can be implemented in at least one of a memory or a processor. The user can use the graphical user interface search through images and video clips to view, select, and purchase products from the media, and/or to learn more about locations in the media, as the user views the media substantially in real-time. Such implementations can substantially reduce the amount of time a user must search for product data relating to products they have viewed in media, can substantially reduce the amount of data which the user must provide and/or process in order to obtain said product data, and/or can substantially optimize the presentation of said product data to a variety of users, e.g., by creating new data structures to accommodate data which has historically been stored and/or maintained separately.

Users can search for products and locations based on the category/type of product, actors and/or characters in the media, or the identity of the media (e.g., the name of a film and/or TV show, and/or the like). Users may also view editorial guides (e.g., via a newsletter, interactive blog posts, and/or the like) which can inform users on how to use products shown in the media, how to use the products with other products, and/or the like. In some implementations, products can include clothing and/or other fashion items, vehicles, and/or the like, while locations can include locations where the media was produced, restaurants and/or shops featured in the media, and/or the like.

The DMPSP may also support an application programming interface (API), software and/or hardware module, and/or a like mechanism which allows external media distributors (e.g., physical and/or electronic distributors) to include DMPSP functionality in products they provide to consumers. For example, external media distributors may create media content including the media itself, as well as instructions and/or other mechanisms for requesting product data from the DMPSP, e.g., when the media content is accessed and/or played, and/or the like. The DMPSP may then provide product, tag, and/or like data to a device and/or program (e.g., implemented on at least one of a memory or processor) playing the media, such that the device and/or program can provide the product data in addition to the media content to the user. In other implementations, the product and/or like data may be embedded in the media file, and/or the media content itself may be configured to determine how to display the product data to a user.

For example, a film shown on Netflix may be embedded with data obtained from the DMPSP with respect to tagged products, locations, and/or the like within the film. Netflix may be configured to access the API hosted by the DMPSP in order to retrieve the information when the film data is requested by a consumer, May use the API and/or like software to incorporate product data for a particular film into the media data structure for the film hosted on Netflix's servers, may use the API and/or like software to incorporate functionality into the media files such that they can query the DMPSP when they need product data and/or other data from the DMPSP, and/or to otherwise configure its media files to support the functionality of the DMPSP. The information obtained from the DMPSP may be interactive and may allow the user to access product data in a manner similar to how product data may be accessed on a user interface provided by the DMPSP. Thus, users may be able to utilize the functionality of the DMPSP without specifically using the user interface of the DMPSP (e.g., may use the functionality of the DMPSP while watching the media online, while watching a DVD including the media, and/or the like).

As another example, in some implementations, after storing product tag data and/or other product data in the DMPSP database, the DMPSP may generate product tag and/or overlay schedules. The schedules may define when to display product overlays and/or tags in a media file, e.g., based on the frame number, timestamp, and/or the like. The schedules may also include tag coordinate information for tags in each frame, and/or the like. The DMPSP may then store the data in the DMPSP database, e.g., as media file metadata and/or the like. If the DMPSP receives a request for a product tag and/or overlay schedule, e.g., from a software module embedded in media content, and/or a like source, the DMPSP may retrieve and then forward the product tag and/or overlay schedule to the media content and/or like source for use during playback of the media content, and/or the like. Similar schedules May also be generated for locations within media files, and/or the like.

FIG. 1 shows a block diagram illustrating example embodiments of the DMPSP. In some implementations, a user 105 can be provided a streamlined method of looking up, searching for, and/or otherwise obtaining information on products and/or services which may be found in media in order to learn more about them, to purchase them, and/or the like. The DMPSP 110 may receive media, process the media in order to determine what products, locations, and/or services are shown within the media, and then allow the user to search for the products and/or services while watching and/or otherwise consuming the media, to store found products in a wish list, to purchase found products, to learn more information about the products and/or services, and/or the like.

In some implementations, the DMPSP may also connect with search engines (e.g., Google, Yahoo, Bing, and/or the like) in order to provide more information about products and/or services via redirecting the user to a search result link which may provide links and/or like information related to the product. In some implementations the search result link may be generated via a pre-scripted search engine query. In some implementations the DMPSP may provide access to search engine results in lieu of providing product and/or service information through the DMPSP interface, and/or may provide search engine results to users seeking to purchase the product and/or service, and/or the like.

In some implementations, the DMPSP may allow users to search for products via viewing media components and interacting with product and/or service overlays on said media components. For example, a product overlay, e.g., implemented via at least one of a memory or a processor, can be configured to retain product and/or service information (e.g., product description data, merchants who sell the product, merchant addresses (e.g., electronic addresses, physical addresses, internet addresses, and/or the like), similar products, and/or the like, and may display the information such that the user can efficiently view what product is displayed in the media clip, where and/or for how much money the user can obtain the product, if there are other products, e.g., which are less expensive and/or look similar, and/or the like. In some implementations the DMPSP may allow users to search for images, product screenshots, and/or media components (e.g., film and/or television stills, magazine pages, and/or the like) showcasing products including but not limited to clothing and/or costume pieces worn by actors and/or models, vehicles and/or tools used by actors and/or models, and/or like, as well as restaurants, national landmarks, stores, theaters and/or like venues, and/or for like services and/or locations. In some implementations, the user may be able to see related images and/or clips from related media sources and/or the same media source with the same or similar products and/or services being looked at by the user. In some implementations, the overlays may show product and/or service details. In some implementations, one may also view a timeline of clips and/or components of a media source and may be able to view a graphical timeline of products shown within the media source based on the timeline of clips and/or components, and/or the like. In some implementations users may search for a particular product and be presented with a graphical list of media sources in which the product has been featured, may be able to search media clips for products and be presented with related products in other media sources and/or the same media source, and/or the like.

In addition to being able to purchase the product shown in the media at an external merchant, the DMPSP may also facilitate the sale of set pieces, set wardrobes, and/or other such products used in the actual filming of the media. For example, the DMPSP may facilitate flash sales of wardrobe pieces actually worn by an actor in a film, e.g., at a price comparable to or less than market retail value, for a predetermined period of time. The first user to select the wardrobe pieces may be able to purchase the products. In some implementations, users who purchase the media (e.g., purchase a DVD of a film, or purchase a season of a television show and/or a music video via an electronic distribution platform such as iTunes and/or the like) may receive a code and/or a like mechanism which may be used to gain early access to set products, and/or the like. Products featured may be rotated on a pre-determined schedule, e.g., hourly, daily, weekly, and/or the like.

Users may be able to create profiles, in which they may provide information such as their name, favorite media quote, favorite products, media sources, actors, performers, and/or the like, and/or similar information. Also included in the profile may be information about matches the user has submitted (e.g., products the user has submitted which have been exact product matches, submitted products which were similar products, and/or the like), and/or ratings and/or up-votes of products and/or comments the user has provided to the system (e.g., see FIG. 14 for more details). Defining a profile and favoriting content may allow a user to receive notifications and/or the like about the media, product, actor, and/or the like. For example, favoriting a film may allow the user to receive notifications whenever a new product match has been made within the film. Similarly, favoriting an actor and/or like performer may allow the user to receive notifications whenever a user has identified a new product which the actor and/or like performer has worn, e.g., in a particular film, television show, and/or music video, or in all media the actor appears in, and/or the like. Favoriting a product may allow the user to receive notifications whenever a new product match and/or new product information has been found for a particular product in a particular medium, in all media in which the product has been identified, and/or the like.

Figure 2:
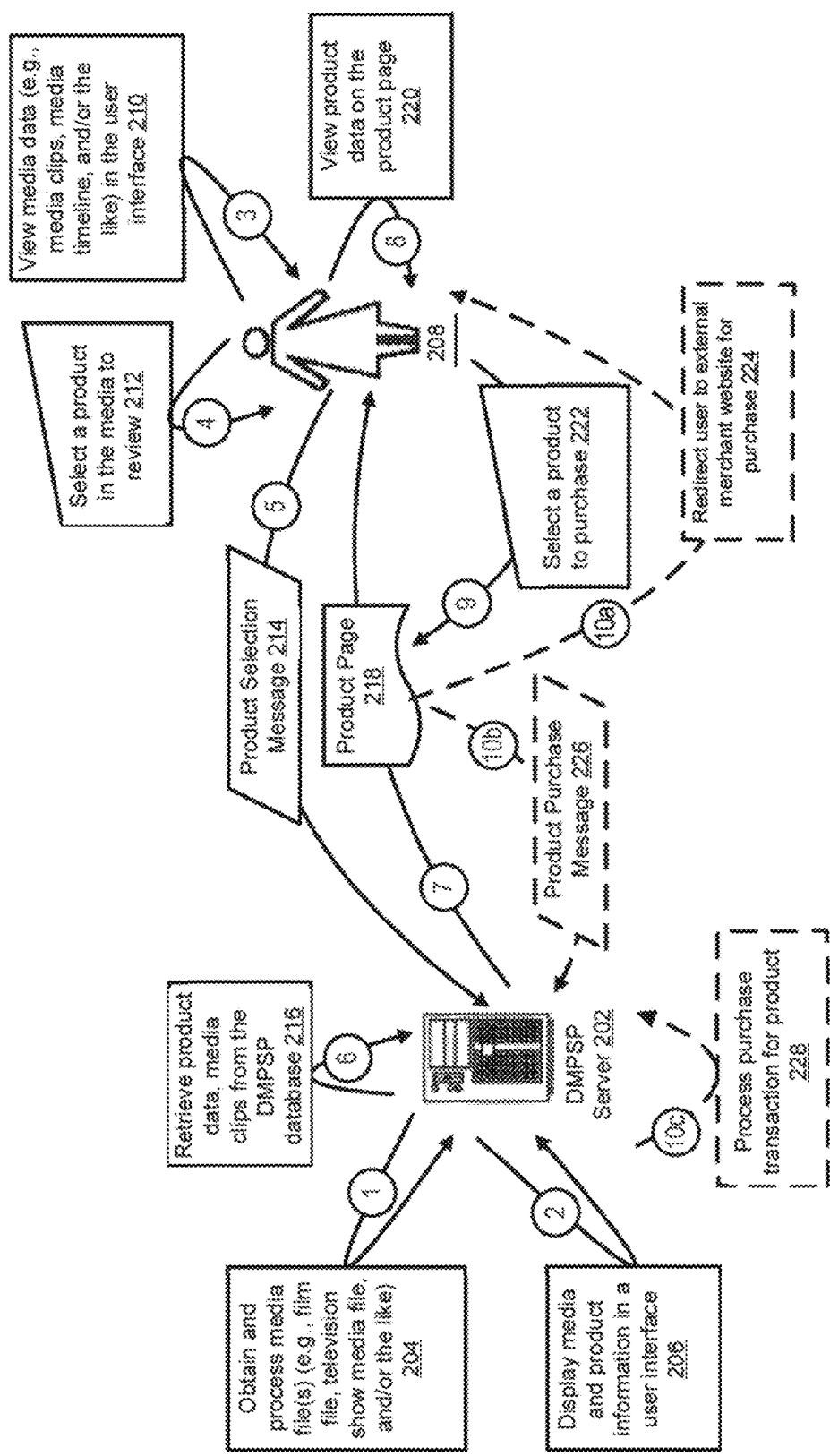
FIG. 2 shows a data flow diagram illustrating searching for and selecting products in media sources in some example embodiments of the DMPSP.

FIG. 2 shows a data flow diagram illustrating searching for and selecting products in media sources in some example embodiments of the DMPSP. In some implementations, the DMPSP server 202 may need to obtain and process media files 204. The DMPSP may automatically obtain media files from external media sources (e.g., via media distribution servers, and/or the like), via uploads from users and/or administrators of the DMPSP, and/or the like. Processing the files may involve splitting media files into scenes (e.g., media clips containing portions of the scene) and processing each scene in order to find products within each of the scenes. In some implementations, image processing algorithms and/or like functionality may be used to detect and identify scene changes in a media file, e.g., by determining whether a camera direction has changed, whether a new location is being shown, whether new characters are being shown, and/or the like. In some implementations, scenes may be stored as separate files, as start and end values (e.g., the starting time within the media file of the scene, and the ending time within the media of the scene), and/or the like.

For example, the DMPSP may split scenes into series of frames, and May analyze each frame for new products, e.g., via image processing, user and/or administrative input, and/or the like. If the DMPSP automatically detects products, the DMPSP may notify users and/or administrators to verify the products which it has identified. Once a product has been identified and/or verified multiple times in some number of frames, the DMPSP may automatically analyze the rest of the frames in each scene to find further instances of the product in the media file and may tag said instances accordingly. Tagged products may then be stored in a DMPSP database, e.g., as product data structures including product information, a URL and/or address to a merchant selling the product, merchant-specific product data (e.g., product SKUs, product identifiers, and/or the like), media and/or scenes in which the product is found, and/or other relevant information.

The DMPSP may then display media and/or product data, e.g., via a web-enabled user interface (e.g., a website on a web browser, a web-enabled mobile application, and/or the like) 206, such that a user 208 may view and/or interact with the media and or products 210. Users may access the user interface via an electronic device, e.g., a computer, laptop, mobile phone, tablet, personal digital assistant (PDA), and/or a like device. Users can select products 212 in the interface to review and obtain more information about the products, e.g., via viewing and interacting with media clips via product tags and/or like indicia. Once a user has selected a product to view, the user's electronic device may generate and send a product selection message 214, which may be a hypertext transfer protocol secure (HTTPS) GET message, which may include media and/or product-identifying information, including but not limited to a product identifier, a media source identifier, media clip information, and/or like data. The DMPSP server may use the information obtained in the HTTP(S) GET message to retrieve 216 product and media data (e.g., details about the product and where it is sold, as well as details about the media clip it is first shown in and/or is associated with, and/or the like).

The DMPSP can then generate and send to the user via the user interface a page for the product 218, which can include product images, a product description, a list of prices for the product at certain merchants and/or whether the product offered at each of the merchants is an exact match of the product in the media clip and/or a similar match to the product in the media clip, other instances of the product in the media file, other similar products found in the media clip, and/or the like. The user May view the product data displayed on the product page 220 and may be able to select a merchant from which to purchase the product 222, e.g., via selecting a purchase button for a particular merchant, and/or the like. The product page may then redirect 224 the user to the merchant's external website in order to allow the user to purchase the item. For example, if the user selects a product sold by Amazon, the user may be directed to the Amazon webpage for the product when the user selects the product for purchasing. In some implementations, the DMPSP may be able to facilitate transactions within the product page and/or another page within the user interface, e.g., without redirecting the user to a separate page. In such implementations, the DMPSP may receive an HTTP(s) POST product purchase message 226 from the product page, e.g., including identifiers for the product (e.g., within the DMPSP database, within an external merchant database, and/or the like), user payment information and/or identifier information, and/or the like. In some implementations the user, instead of purchasing a product identified in the media file, may purchase goods and/or services relating to a set location featured in the media file; in such implementations, product purchase message 226 May include a purchase interest request (e.g., a request to purchase goods and/or services relating to a set location), including identifiers for a product and/or service relating to the set location tagged within the DMPSP, user payment information and/or user identification information, and/or the like. The DMPSP may then use the data in the product purchase message to retrieve data about the product and/or the user (e.g., product availability, product price, user payment data, and/or the like), and May process a purchase transaction 228 between the user and the DMPSP and/or an external merchant, for the purchase of the product.

Figure 3:
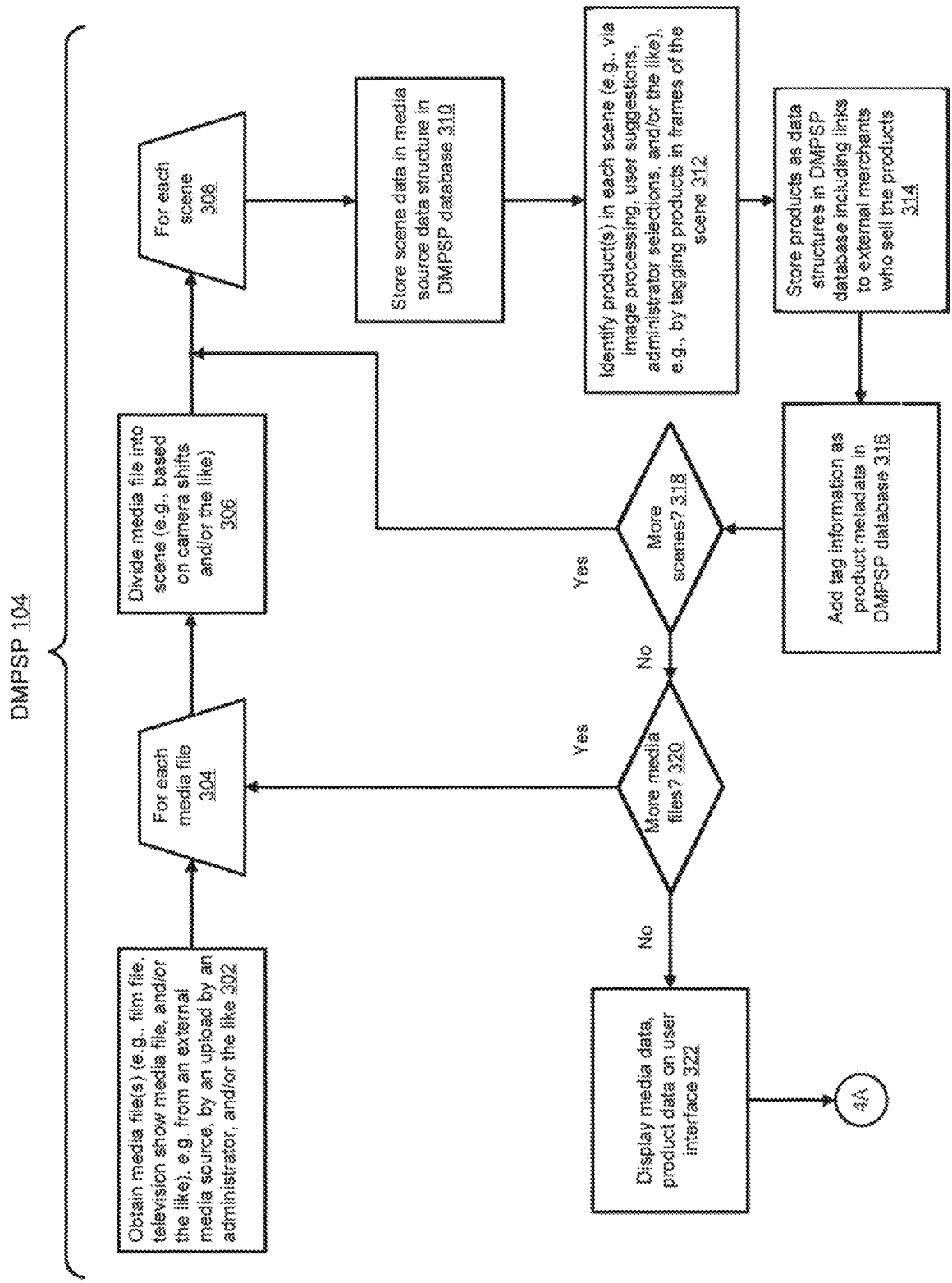
FIGS. 3, 4, and 5 show logic flow diagrams illustrating searching for and selecting products in media sources in some example embodiments of the DMPSP.
Figure 4:
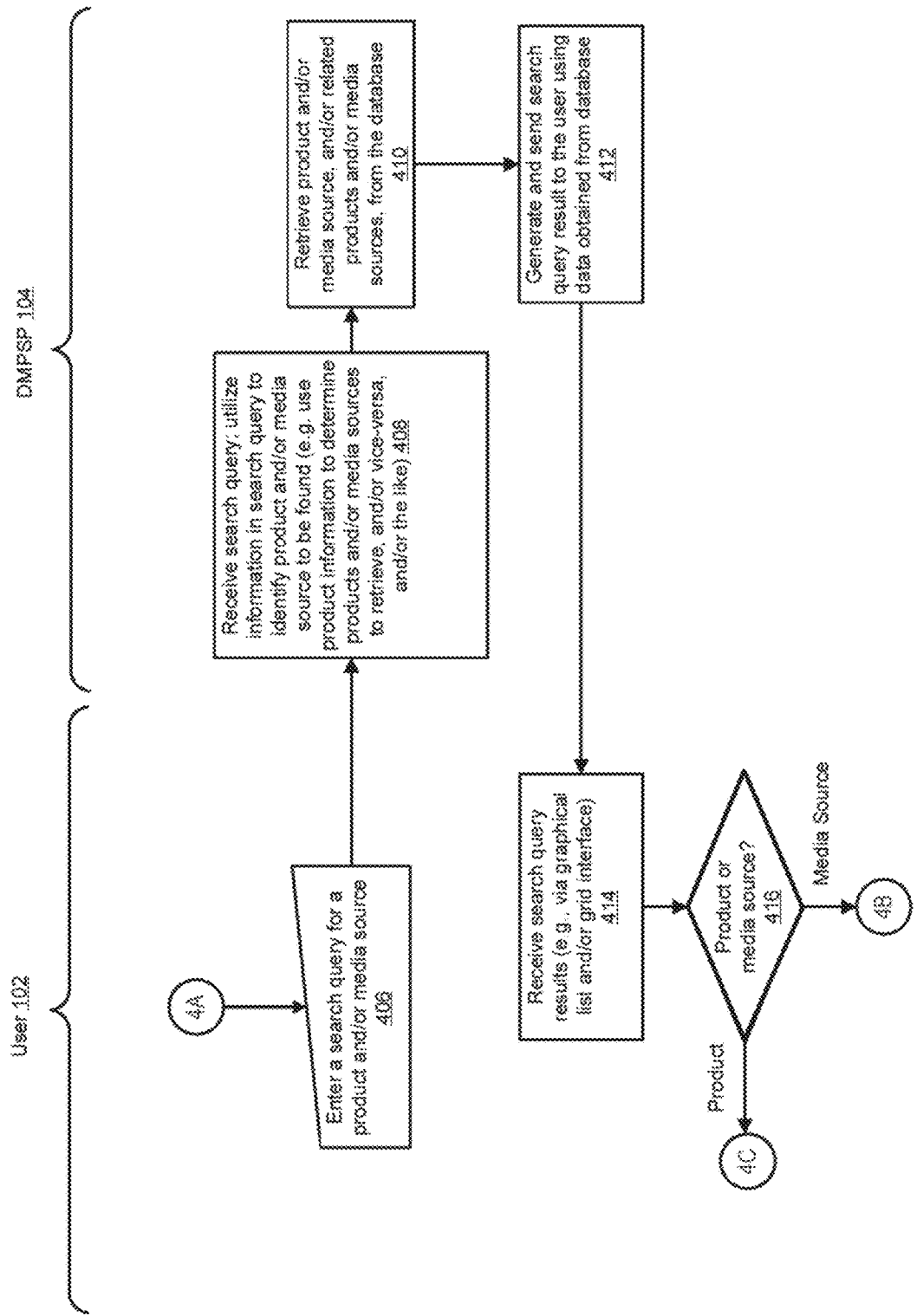
Figure 5:
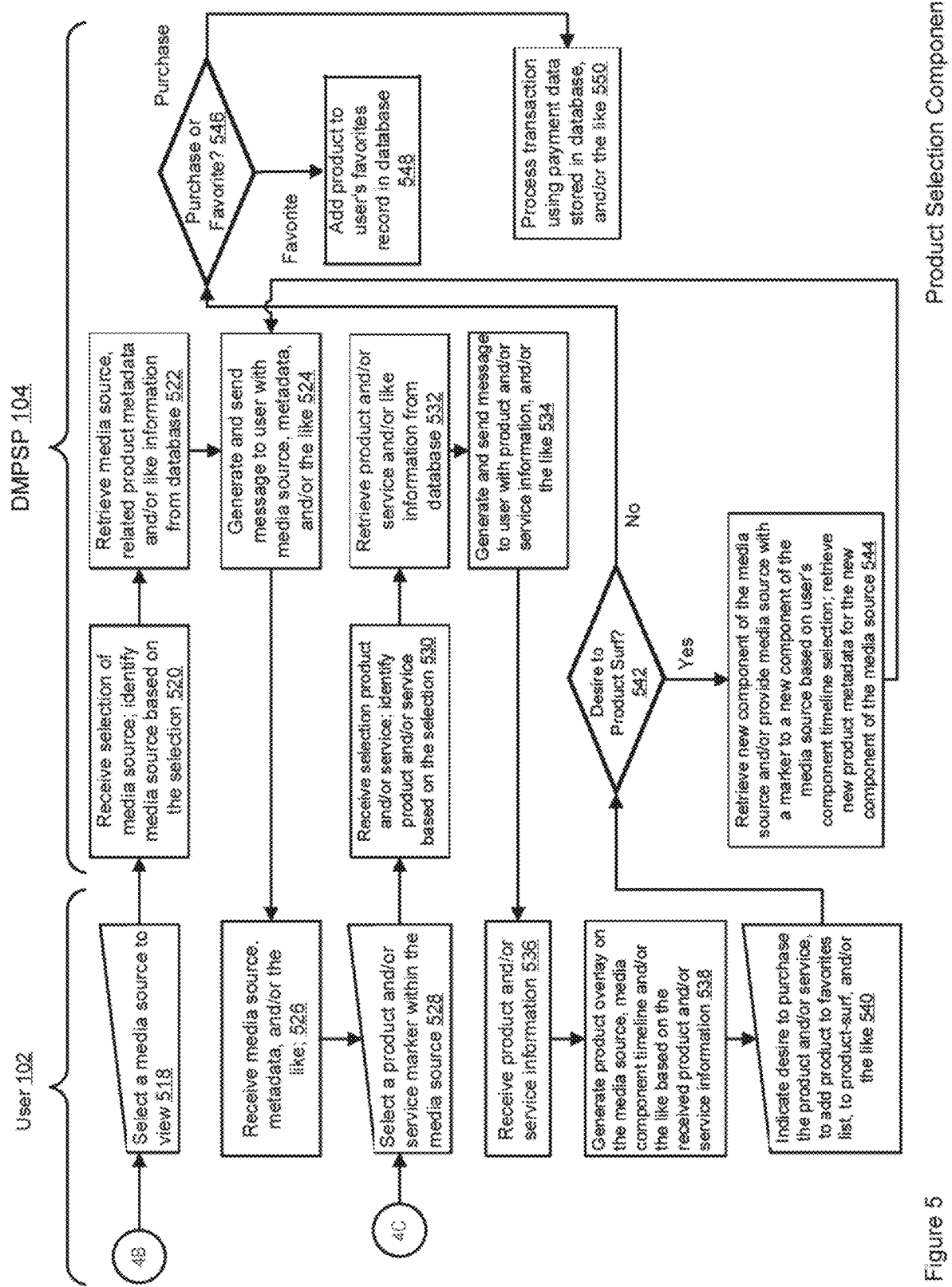
Figure 6:
FIGS. 6-21 show screenshot diagrams illustrating some embodiments of the DMPSP.

FIGS. 3-5 show logic flow diagrams illustrating searching for and selecting products in media sources in some example embodiments of the DMPSP. Referring to FIG. 3, the DMPSP may obtain 302 media files, e.g., from an external media source, via an upload by a user and/or administrator, and/or the like. For each media file 304 the DMPSP obtains, it may split 306 the media file into discrete scenes for processing. For example, the DMPSP may segment the media file into time blocks, e.g., based on camera shifts, imported media metadata, and/or the like, and may store the time block data as metadata in the media file, may split the media file into separate scene files, each of which is separately stored in the DMPSP database, and/or the like. For each scene 308 in the set of scenes derived from the media file, the DMPSP May store 310 scene data in the media source data structure, e.g., in the media source metadata, and/or the like. In other implementations, the DMPSP may also break the media source file into scenes which may each be stored as separate media file data structures in the DMPSP database.

For each scene, the DMPSP may further break up the portion of the media source file embodying the scene into frames, each of which the DMPSP may process, e.g., using image processing and/or like algorithms, to recognize products 312 which can be identified and tagged within the frame. For example, the DMPSP can use image processing and contextual knowledge of various products already analyzed and tagged in other media source files to determine an actor is wearing a watch, and may use product data in the DMPSP, images of watches on external data source servers, and/or the like to identify the type of watch identified in the frame. Additionally, in some implementations the DMPSP can allow external users and/or administrators to manually tag and/or suggest tags for products in frames of the scene, and may use tags from users and/or administrators to automatically tag the same product in other frames of the scene, in the media source file as a whole, and/or the like. The DMPSP can also allow users and/or administrators to verify tags that the DMPSP and/or other users and/or administrators have generated for the product, e.g., prior to processing a full scene and/or media source file to identify other instances of the product. The DMPSP can then store 314 the product information obtained (e.g., the product name, product description, product keywords, product URL and/or merchant identifiers (e.g., product SKU and/or a merchant-specific identifier), product prices, a list of similar products, and/or the like) in a product data structure in the DMPSP database.

A product can be tagged within a media source via adding a tag icon to the frame image, as well as attaching product metadata to the tag icon (e.g., product name, description, image, and/or the like). A user can, for example, hover over the tag icon using her mouse pointer, in order to activate a product thumbnail overlay which can show the product metadata (e.g., see FIG. 18). Tag icons may be able to indicate who generated the tag (e.g., whether a user, administrator, and/or the DMPSP generated a product tag), how close the tagged product is to a product associated with the tag in the DMPSP database (e.g., whether the product in the frame has been tagged with a product that is an exact match, a product that is a close match, and/or the like), and/or similar information. The tag information may be stored within a product metadata data structure in the DMPSP database 316, and may include image coordinates and a frame number at which to overlay the tag, the product information to show when hovering and/or selecting a tag, and/or the like.

Once the DMPSP has processed the frames within a scene, it can determine if there are more scenes to process 318 and can continue to process scene frames for further products and/or to add more tags for the product. If there are no other scenes left to process in a particular media file, the DMPSP may determine whether there are other media files available to process 320, and may process them, e.g., in a manner similar as above. Once the DMPSP has processed the available media files, the DMPSP may proceed to display 322 media data, product and/or tag data, and/or the like within the user interface, e.g., as pages on which the user can access media content and/or product content.

In some implementations, referring to FIG. 4, a user may wish to enter a search query 406 for a product and/or media source, and/or the like. In some implementations, the DMPSP may utilize the user's search query to identify a product and/or service, and/or a media source, that the user wishes to search for, and may determine what information to retrieve based on the identified product and/or service, and/or media source 408. In some implementations, for example, if a user searches for a product, the DMPSP may search for the product, and/or similar products to be recommended for the user. The DMPSP may also retrieve a list of media sources and/or the like which the user may peruse in order to find the product and/or like products. In some implementations, if a user searches for a media source, the DMPSP may search for the media source, and/or may also retrieve a list of all products shown in the media source, and/or any related products, and/or the like. In some implementations, the DMPSP may retrieve the product, media source, and/or related products from a DMPSP database 410. The DMPSP may then generate and send a query result to the user including the data retrieved from the database 412. The user may then, after receiving the search results (e.g., via a graphical list and/or grid interface) 414, interact with the data provided by the DMPSP. If the DMPSP provided media source search results data 416, referring to FIG. 5, the user may select one of the media sources provided in the search results 518. The DMPSP may receive the selection made by the user 520, and may identify which media source the user selected based on data provided to the DMPSP when the user selected the media source. The DMPSP may then retrieve the media source, any related product metadata (e.g., any data related to marking products and/or services within the media source, and/or the like), and/or any other relevant information from the DMPSP database 522, and may generate and send a message to the user 524 containing the media source selected, the product metadata associated with the media source, and/or any other relevant information.

In some implementations, the user may receive the media source 526 along with the metadata and/or like information and may be able to view and/or otherwise interact with the media source. The user may also be able to select a product and/or service marker within the media source 528 (e.g., may be able to select a product and/or service in the media source via clicking on an indicator on the product within the media source viewer), e.g., for the purpose of obtaining more information about the product, and/or the like. In some implementations the DMPSP may receive the selection and may use the selection data to identify the product and/or service the user would like to learn more about 530.

The DMPSP may retrieve product and/or service data from the database and may package the data via generating and sending a message to the user with the product and/or service data, and/or any like data 534. In some implementations, once the user's interface has received the product and/or service information sent from the DMPSP 536, it may be able to generate and/or render a product overlay and/or thumbnail image over the media course based on the product and/or service information 538, as well as generate a thumbnail and/or like time line and/or collection of media components (e.g., portions of a media source, and/or the like) and/or the like so that the user may select in order to view other portions of the media and/or the like to see other products and/or services, other portions of the media source which contain the selected product and/or service, and/or the like.

The user may be able to indicate a desire to perform an action on the product 540 (e.g., to purchase the product, to add the product to a favorites list, to product-surf, e.g., via selecting media components within the timeline to view, and/or the like). In some implementations, if the DMPSP receives a request to product-surf and/or the like 142, the DMPSP may retrieve data regarding the media component the user selected from the component and/or thumbnail timeline (e.g., may retrieve the selected media component data from the database, and/or the like), may retrieve the whole media source and may mark the media source to start and/or open at the beginning of the media component, and/or the like 544. The DMPSP may also retrieve any product metadata associated with the selected media component, and/or like data, and may generate and send a message to the user 524 containing the media source (and/or the retrieved media component), the product metadata, and/or the like.

In some implementations, if the DMPSP receives a request to purchase the product and/or service 546, the DMPSP may use any payment data stored in its database to process a transaction with a merchant which sells the selected product and/or service, may send the user to the merchant's website and/or the like in order to process the transaction, and/or the like 550. If the DMPSP receives a request to add the product and/or service to a favorites list, the DMPSP may then add the product and/or service to a favorites record associated with the user in a DMPSP database 548, e.g., via updating and/or creating a favorites list record, and/or the like. In some implementations, referring to FIG. 4, if the user receives product and/or service search results and selects a product and/or service for further review, the DMPSP May referring to FIG. 5, identify the product and/or service from the results that the user selects 530, and may continue the process of providing product and/or service data to the user accordingly.

FIGS. 6-17 show screenshot diagrams illustrating some embodiments of the DMPSP. Regarding FIG. 6, in some implementations, the DMPSP May provide a user interface which may allow users to view media 604 in order to search for products and/or services. In some implementations the DMPSP may also work with existing services (e.g., Netflix, Hulu, Apple iTunes, Amazon Instant Video, and/or the like) to show users information about products 606. In some implementations the name and/or publishing information for the media 602 may be provided to the user, along with a thumbnail and/or like image of the product 606, a description of the product 608 (which may include the product name, size, price, description, and/or the like), and/or the like.

Figure 7:
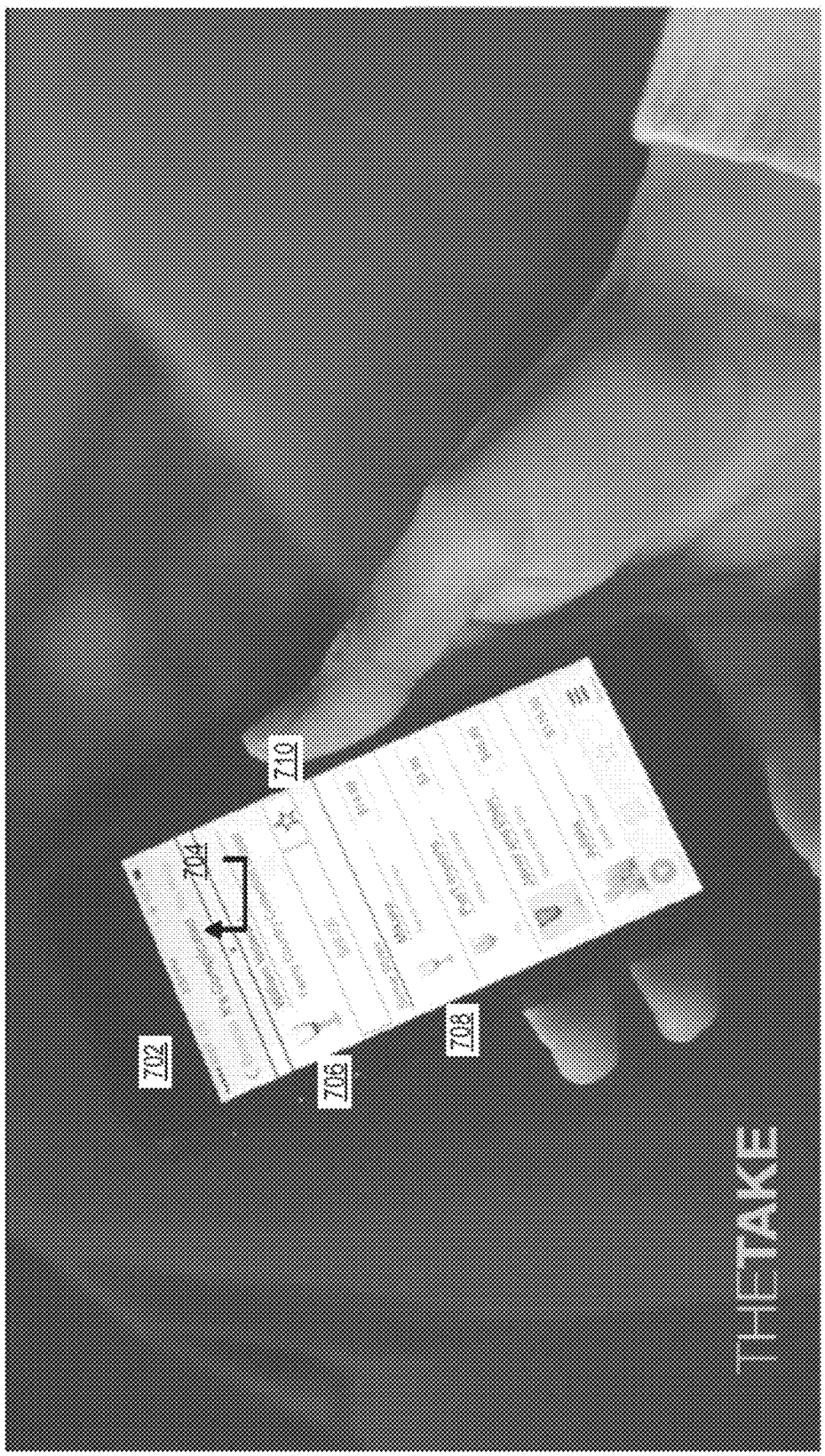

Regarding FIG. 7, in some implementations the user may be able to search for products on her mobile device 702, and may be able to search within a particular media clip 704 (e.g., a film and/or film clip, and/or the like) in order to find a product 706 that the user seeks to purchase, add to a favorites list (e.g., by toggling a "favorites" button 710 and/or the like), and/or the like. In some implementations the user may be able to see a description of the product (e.g., the name of the product, a description of the product, the price of the product, and/or the like), and may also be able to view a list of similar products 708 (e.g., found within the same media clip, found within other media, and/or the like), along with information about each of the similar products. The user may be shown whether the item is in stock at a particular store, and may offer alternative stores at which to purchase the item if the item is not in stock at a preferred and/or indicated store.

Figure 8:
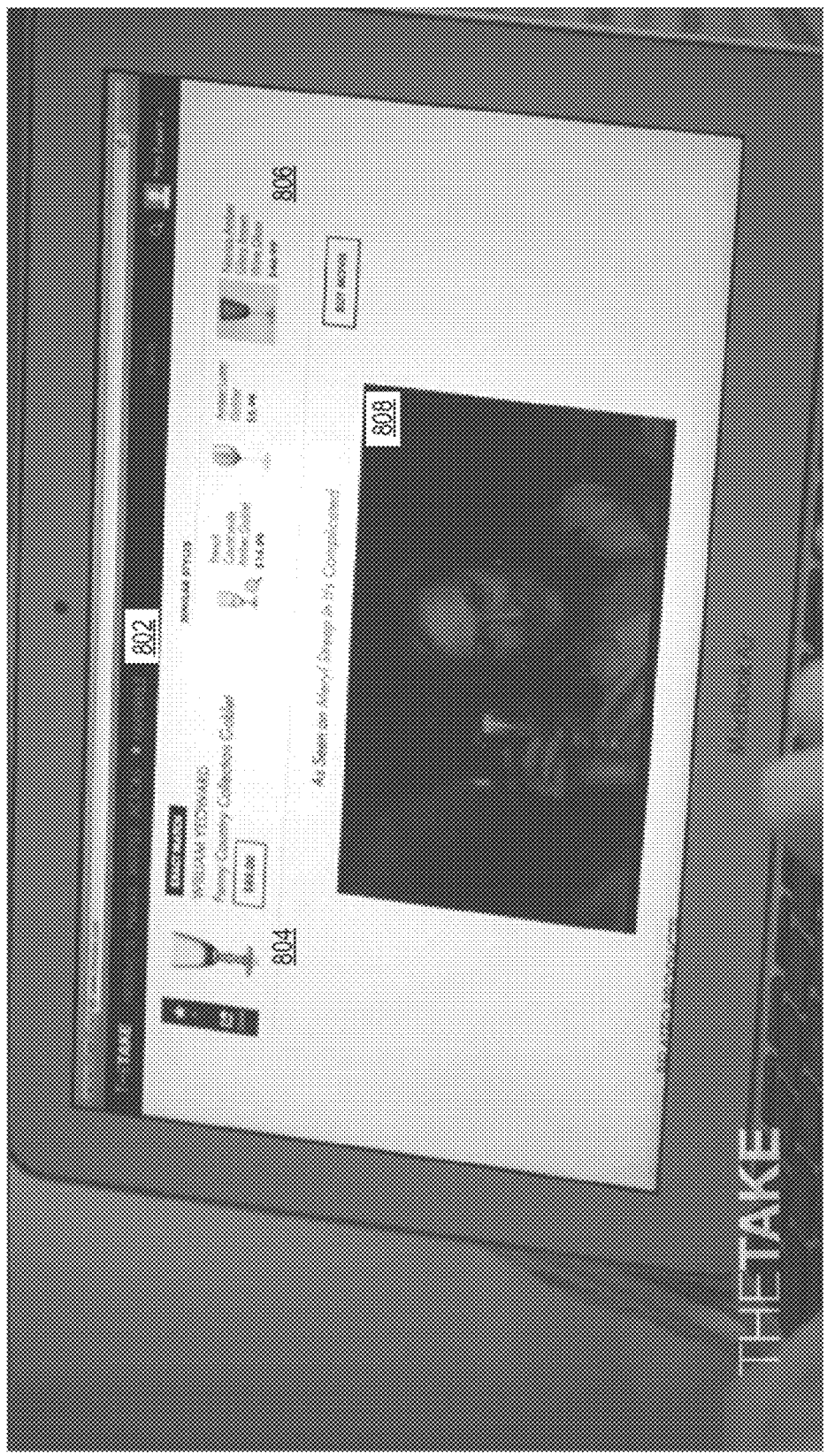

Regarding FIG. 8, in some implementations the user may be able to search products, places, movies, television, and/or like media, actors, products and/or services added to a favorites list, and/or the like 802. The DMPSP may display the product on its own page and/or like representation. While using the DMPSP user interface, the user may be able to view media and/or a media clip 808, which may be a portion of the media where the product is showcased, worn, and/or otherwise used, and may select a product and/or service in the clip to learn more about the product. The product selected may be shown above and/or otherwise outside the viewing window of the media 804, and similar products and/or services may also be shown with the selected product 806. In some implementations the media clip may be configured to pause and/or stop at the first instance within the media clip where the product is shown.

Figure 9A:

Regarding FIG. 9A, in some implementations a user may also be able to interact with the DMPSP on a mobile device, as well as on the DMPSP user interface. For example, in some implementations, a user may be watching a film and/or consuming media on one device 902 and may be able to search for products and/or services within the media on another device 904. In some implementations the second device may determine what media to search through based on the audio from the media, an image of the media taken with a camera within the second device, and/or the like. In some implementations the second device may be able to utilize an application (e.g., provided by the DMPSP, developed using media recognition API provided by the DMPSP, and/or the like) in order to allow the user's second device to identify the media source. In some implementations said API may also be used by other entities to tag media sources not stored on the DMPSP (e.g., to tag images and/or like media sources on third-party websites and/or otherwise owned by third-party entities, such as movie studios, third-party image aggregators (e.g., Pinterest and/or the like), and/or the like), which may later be imported into the DMPSP, and/or the like), and/or for like purposes.

The mobile application may include various features also included in the website implementation of the user interface, including but not limited to viewing particular scenes in a media clip and being able to view a timeline of scenes in the media clip, purchasing film and/or Fandango tickets to a film, purchasing a physical copy and/or electronic copy of the media (e.g., a DVD or Blu-ray copy of a film, an iTunes copy of a television show season, and/or the like), and filtering media clips by media name, actors and/or like performers in the media, and/or the like. Additionally, the mobile application may also allow for showing indicia (e.g., colored icons and/or the like) which indicate how close of a match a product is (e.g., a green icon may indicate the product is an exact match, a yellow icon may indicate the product is a close match, and/or the like), and favoriting products, locations, films, actors, and/or the like.

Figure 9B:
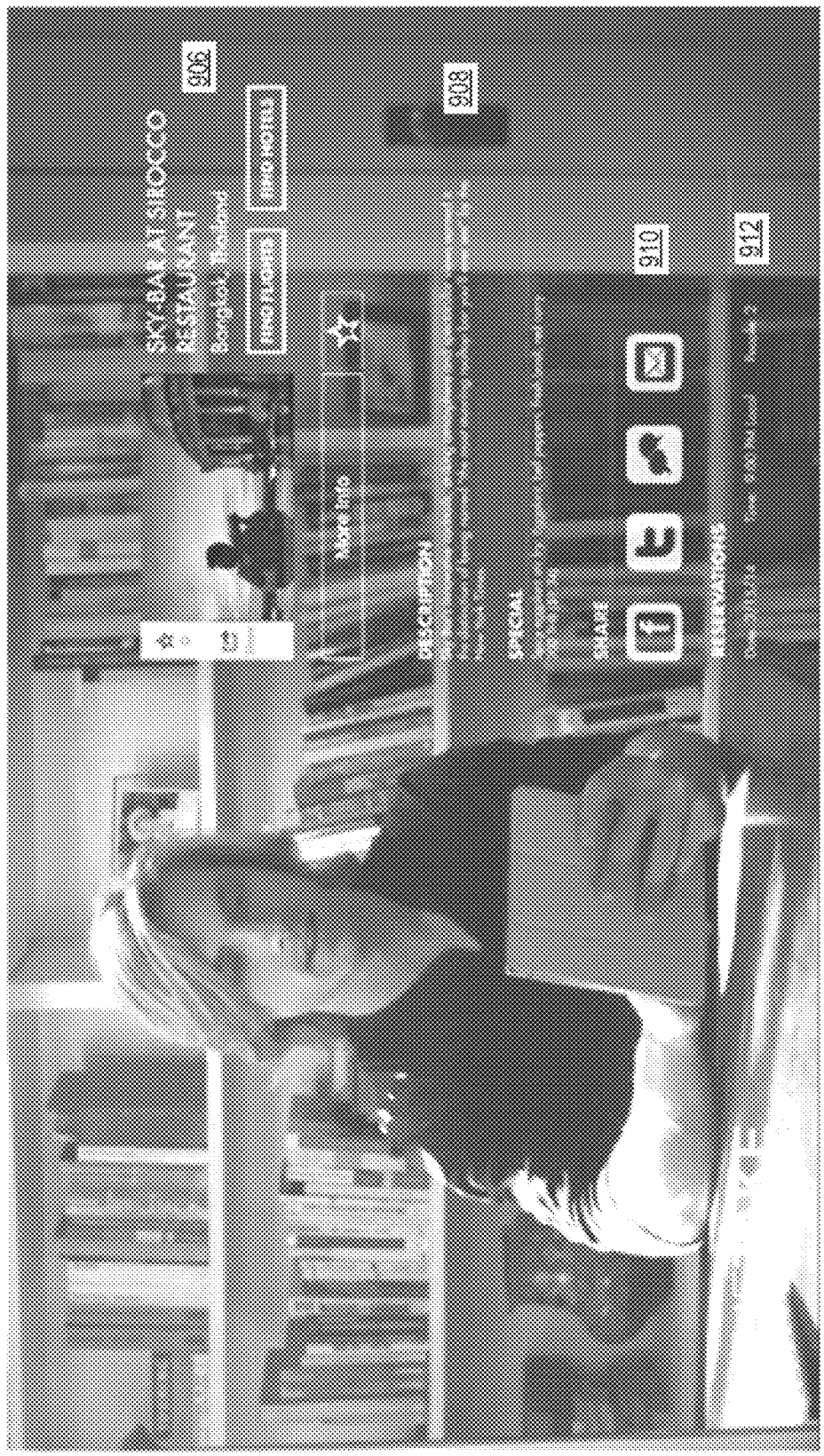

Regarding FIG. 9B, in some implementations the user may also be able to look up and/or search for restaurants and/or like establishments shown in media. In some implementations a user may be able to see the name of the restaurant, as well as its location 906. The user may be able to obtain more information about the location, find flights and/or hotels near the location, favorite the location, and/or the like. In some implementations the user may also be shown a description 908 of the location (e.g., including any specials, offers, and/or the like associated with the location, and/or the like), may be able to share the location 910 (e.g., via social networking website such as Facebook, Twitter, Pinterest, Tumblr, and/or the like, via chat and/or mobile SMS, via email, and/or the like), and may be able to view and/or make reservations for the location 912, and/or the like. For example, the user may be able to reserve a table at a restaurant, may be able to book tickets and/or hotels near and/or at the location, and/or the like.

In some implementations, a user may also be able to view locations by accessing a map, e.g., via Google Maps and/or a like map service. For example, the DMPSP may utilize a map service to show locations relating to the media clip the user has selected, the location the user has selected within the media clip, and/or the like. From the map, a user may be able to view a description of the location, as well as links to relevant data pertaining to the location, and ratings (e.g., Yelp ratings, TripAdvisor ratings and/or the like) of the location. On a mobile application and/or like interface, the DMPSP may be able to use the user's global positioning system (GPS) and/or like geolocation data in order to locate set locations and/or other locations related to media stored on the DMPSP, which are within a certain radius and/or distance of the user. For example, a user located in Manhattan may be able to use the interactive map interface to view locations which relate to locations where scenes were filmed, e.g., from all media in the DMPSP, from selected and/or favorited media in the DMPSP and/or the like. Users may be able to view details about the media from the location interface, such as but not limited to the name of the media, when it was filmed at the location, a rating for the media (e.g., obtained from a media rating website such as Rotten Tomatoes and/or the like), and/or similar data.

Figure 10:
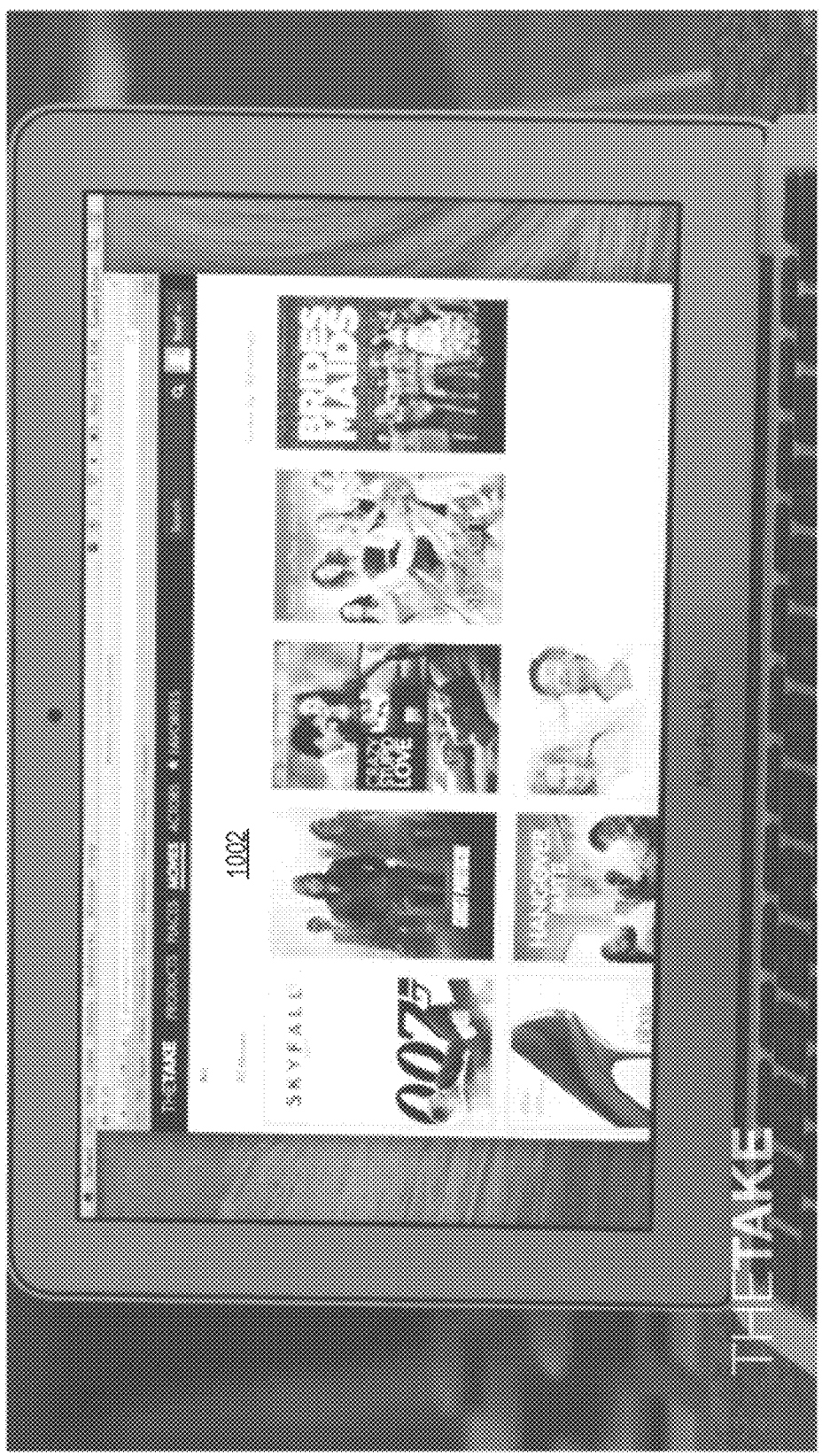

Regarding FIG. 10, in some implementations the user may be able to search for products and/or services via searching by media 1002 in order to find media components and/or the like which may show the products and/or services. Regarding FIG. 11A, selecting a media source and/or component may allow the user to view information about the media source and/or the like 1102 (e.g., the title of the media source, options to purchase the media source and/or to view a trailer and/or preview of the media source, and/or the like), may allow the user to search and/or view products by actor 1104 (e.g., within the media source or related to actors within the media source, and/or the like), and may allow the user to view a graphical representation of products 1106 within the media source that the user may be searching for, may allow the user to view the entirety of the media source (e.g., via the DMPSP interface, via a third-party viewing interface, and/or the like), and/or the like.

Figure 11A:
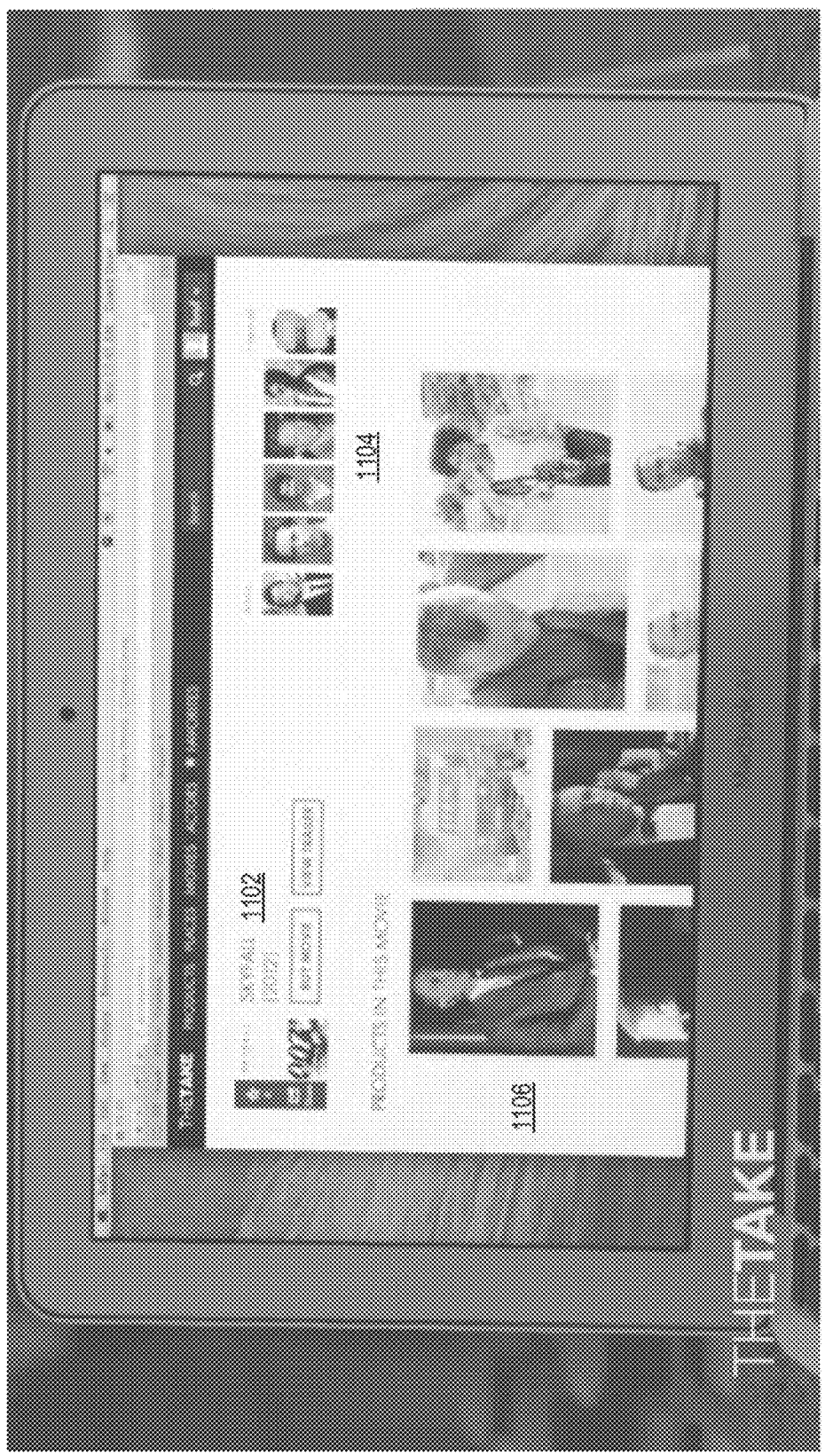
Figure 11B:

Regarding FIG. 11B, in some implementations, users may be able to further filter products linked to the media source via selecting particular actors and/or the like to search through 1108. In some implementations this may allow the user to only view products and/or services worn and/or used by the particular actor within the media clip, and/or the like. In some implementations the user may remove the filter at any time via selecting a remove actor filter option 1110.

Figure 12:
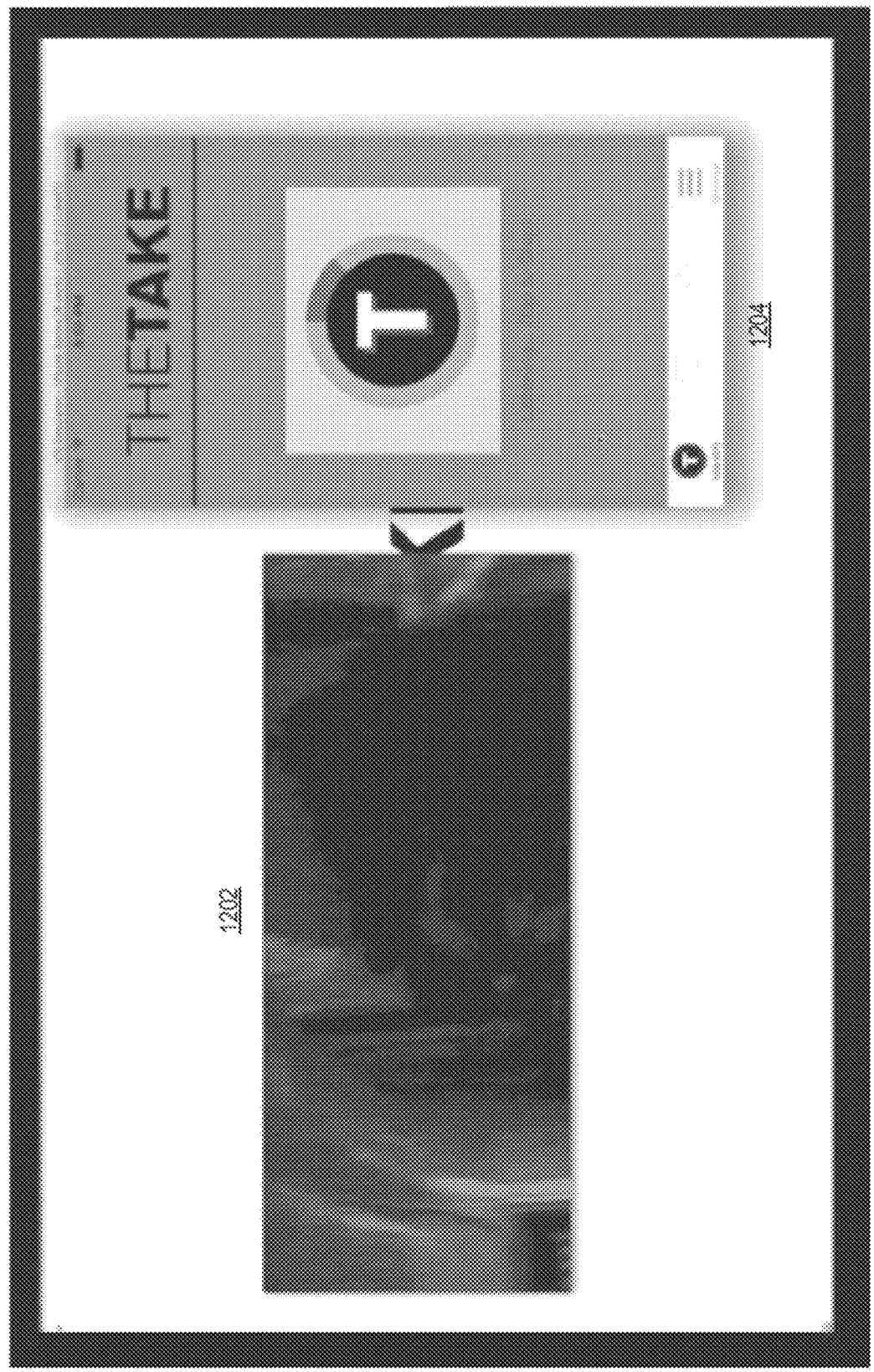
Figure 13A:
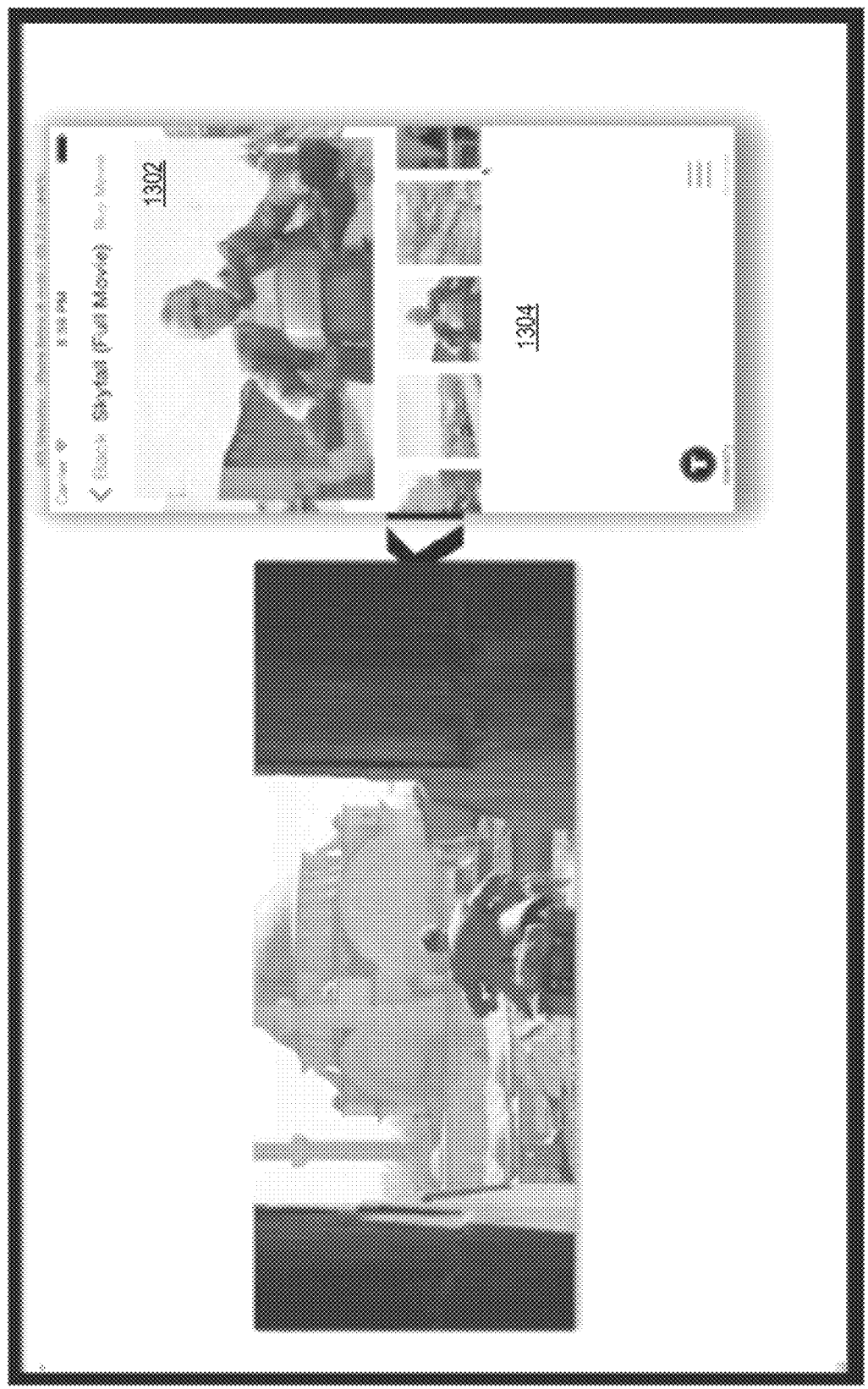
Figure 13B:
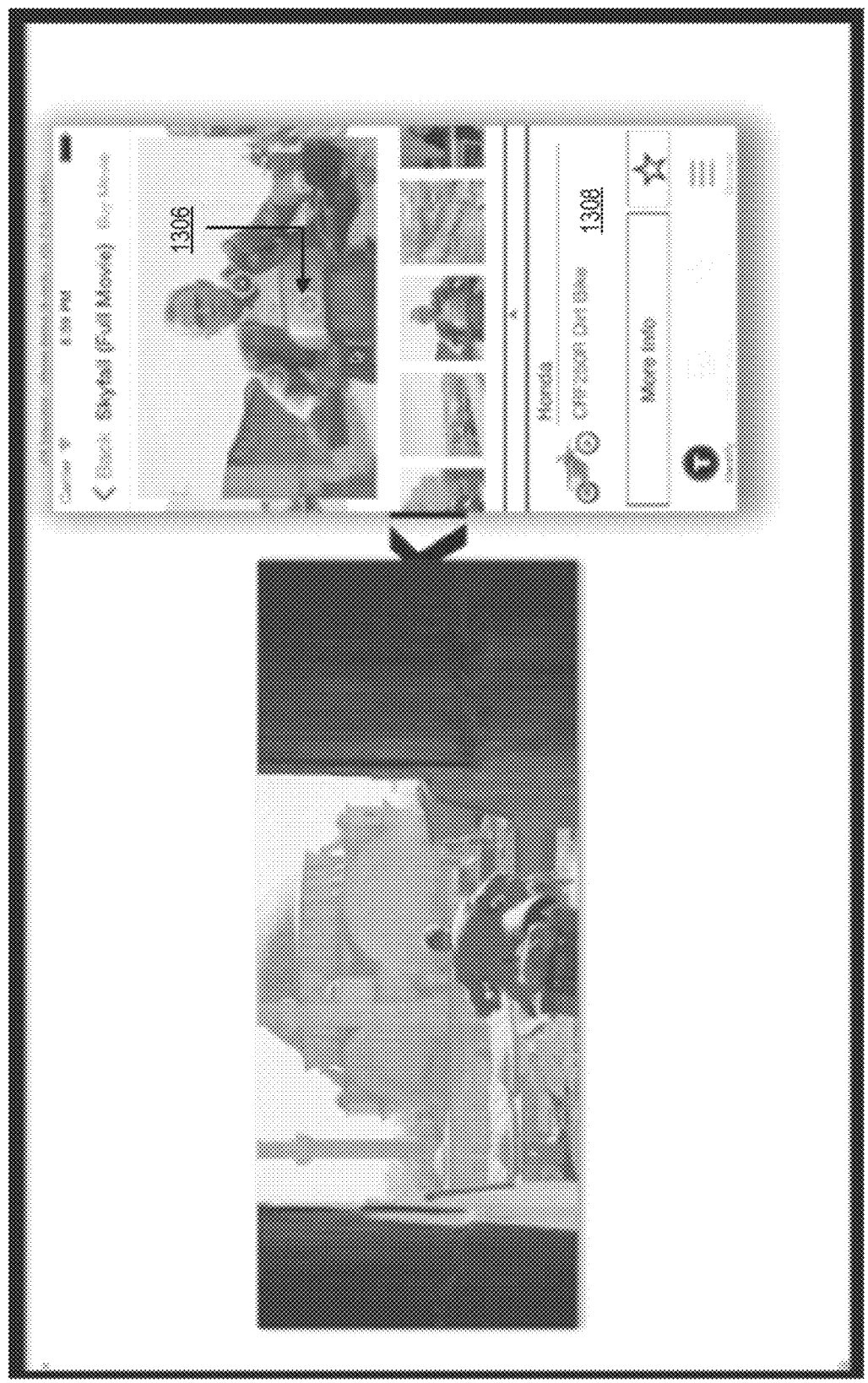
Figure 13C:
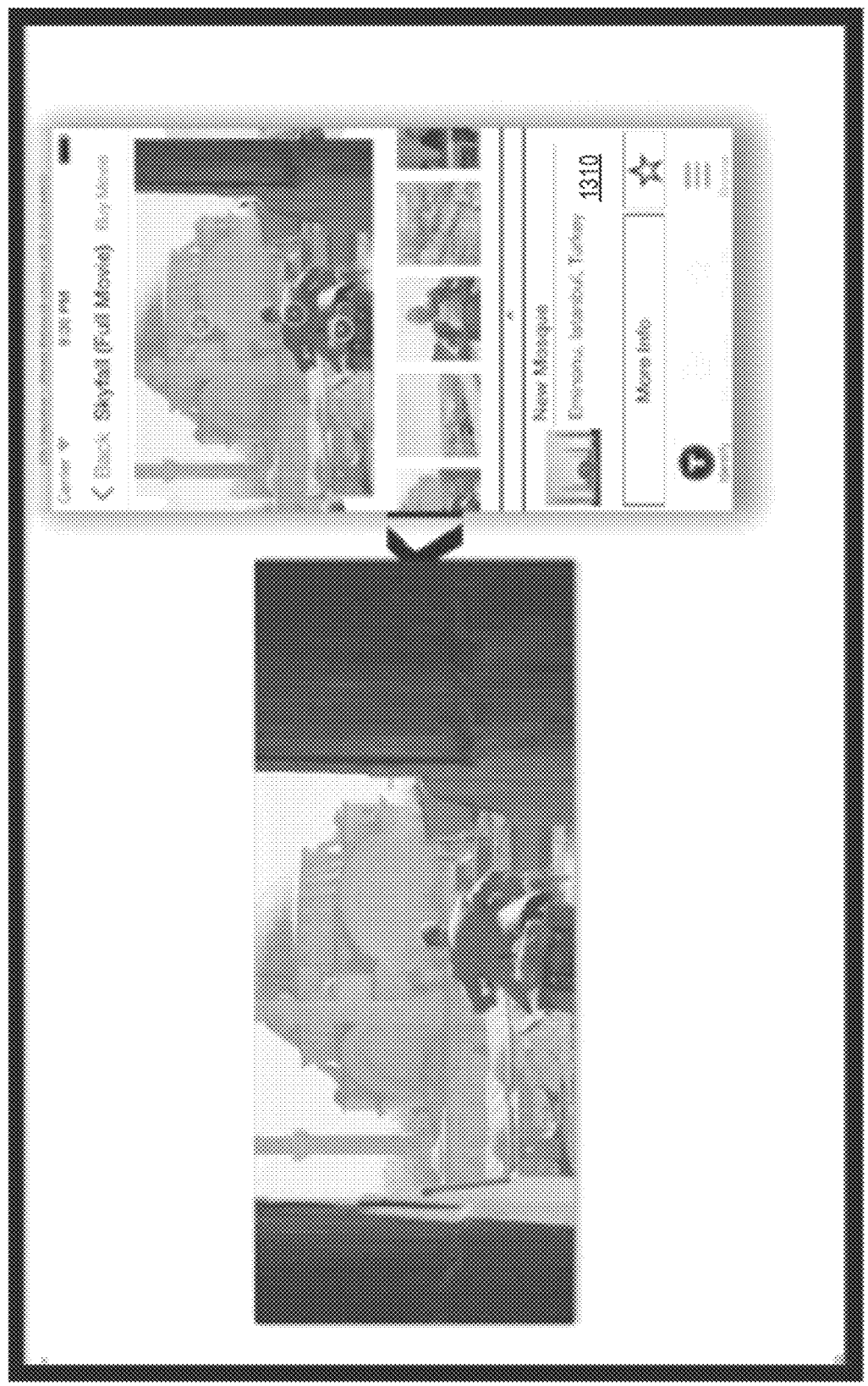

Regarding FIG. 12, in some implementations a user may utilize a mobile device while watching a media source and/or the like in order to obtain information about products and/or services within the media source. In some implementations the user may watch a media source on one device 1202 (and/or May view and/or read a media source on one device and/or paper, and/or the like), and May use a second device 1204 to search for products and/or services, e.g. via allowing the second device to process the audio and/or images from the media source in order to determine the media source and to retrieve all products related to the media source from a database, and/or the like. Regarding FIG. 13A, in some implementations the DMPSP interface on the second device may pull up the user's media source 1302, as well as may provide the user with subcomponents 1304 (e.g., media clips, and/or the like) that the user may search through in order to find products and/or services, rather than needing to consume the entire media source to find a particular scene, page, and/or the like containing products and/or services. Regarding FIG. 13B, in some implementations, the DMPSP interface may overlay markers 1306 on the media source, which the user may interact with in order to view product and/or service information 1308 related to any products and/or services that can be seen within the media source. In some implementations, a user may be able to view products, locations (e.g., regarding FIG. 13C, for example, 1310), and/or the like.

Figure 14:
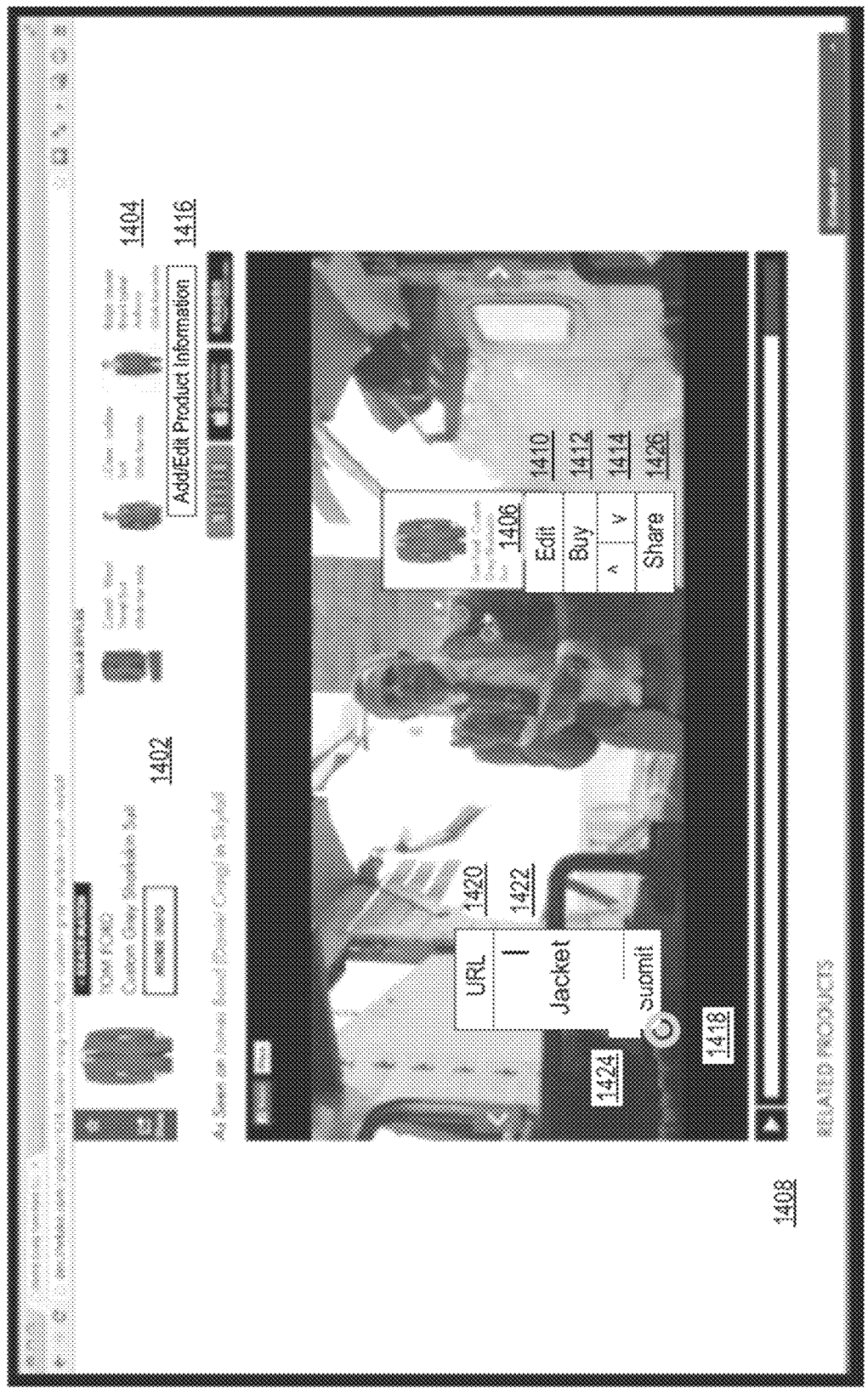

Regarding FIG. 14, in some implementations interacting with the overlay may allow the user to view a thumbnail and/or like image of the selected product and/or service 1406 overlaid on the media source, an option to look at further information about the product and/or service 1402, a list of similar products and/or services 1404, and/or the like. In some implementations the user may also be able to pause and/or play 1408 a playable media source (e.g., a video and/or the like) in order to navigate through the media source to find more products and/or services, and/or the like. In some implementations, the user may also be given the option of editing the particular product's data 1410, buying the product 1412 (e.g., via a one-click button purchase and/or like mechanism which may pull the user's payment information from the DMPSP database for processing the transaction, which may redirect the user to a merchant and/or like entity in order to facilitate a transaction, and/or the like), and/or the like. The user may also be able to vote 1414 on how accurate the product information is, and/or the like.

In some implementations, the DMPSP may be able to crowdsource the addition of products and/or services to the media source's product metadata by allowing users to add and/or edit any product information in the metadata within a particular media source view 1416 via pressing an "Add/Edit Product Information" button and/or the like. In some implementations, the user may be able to select a location within the media source 1418 corresponding to a product and/or service the user wishes to add, and may be presented with a blank window which may allow the user to provide a URL 1420 containing product and/or service information (e.g., a product page from Amazon and/or a like merchant, an image of the product, and/or the like) which may be added to the product entry, may be able to manually provide a description of the product 1422, and may also be able to submit 1424 the new product and/or service entry for review and processing by the DMPSP.

In some implementations the URL provided to the blank product entry may allow the DMPSP to extract information (e.g., images, text, and/or the like) which may also be incorporated into the product description 1422. The DMPSP may also generate metadata (e.g., keywords, and/or the like) to include in the product data structure. Users may also include their own keywords to incorporate into the product entry. In some implementations, once an entry has been approved to be added to the media source's product metadata, other users may be able to further edit the entry, may be able to vote on the entry, and/or the like. The user may also be able to share 1426 products viewed within the media source viewer, e.g., via email, via a social networking site (e.g. Facebook, Twitter, Pinterest, and/or the like), and/or the like. In some implementations, any user that receives a share link to the product may be provided with a link to the product within the media source and may be able to view the media source linked to the shared product. In some implementations, users who receive and/or obtain the share link may be able to view the media source via a paid-through advertising impression by clicking on the share link. The DMPSP may also be able to generate a list of similarly matched items (e.g., items which are similar but not exactly the same as the product in the media, and/or items which are less expensive than the product in the media) by using the keywords added to the product data structure (e.g., by submitting the keywords to an external application programming interface (API) configured to return products matching the submitted keywords).

In some implementations, the DMPSP may also allow users to add comments to media clips and/or product pages, e.g., including further information about untagged products in the media clip, new information about tagged products in the media clip (e.g., a link and/or identification of a product for which the DMPSP only has a similar match), and/or the like. Users may also provide information about locations within the media clip, and/or the like. Users may verify the information of other commenters and indicate to the DMPSP that the comment is either verified or incorrect, e.g., by up-voting and/or otherwise rating the contents of other user's comments. Comments that cross a pre-determined rating threshold (e.g., comments that are up-voted at least five times, and/or the like) may be automatically processed by the DMPSP such that the DMPSP incorporates the data from the comment into the system. For example, if a comment suggests that a product identified in the comment is the real product in the media clip, and the comment is favorably rated by ten other users, the DMPSP may parse the comment to determine the new information the comment provides (e.g., the real product in the media clip), and may automatically obtain more information to update its records (e.g., may automatically obtain more information about the identified product, e.g., via external search queries about the product, and may store the obtained information in the DMPSP database).

Additionally, the DMPSP may allow users to submit portions of the media not shown in the DMPSP user interface (e.g., media clips and/or scenes from the media which are not included in the timeline provided by the DMPSP, and/or the like). Users may be able to solicit feedback about items the submitter has identified in the media portion, and/or regarding products the submitter was unable to identify. For example, if a user submits a screenshot of a scene in a film, the user may indicate new products shown in the screenshot which are not shown in other scenes of the film, may indicate new viewings of products identified in other scenes of the film displayed by the DMPSP, and/or may request that other users help identify products in the screenshot, which May or may not be related to other products identified by the DMPSP.

Figure 15:
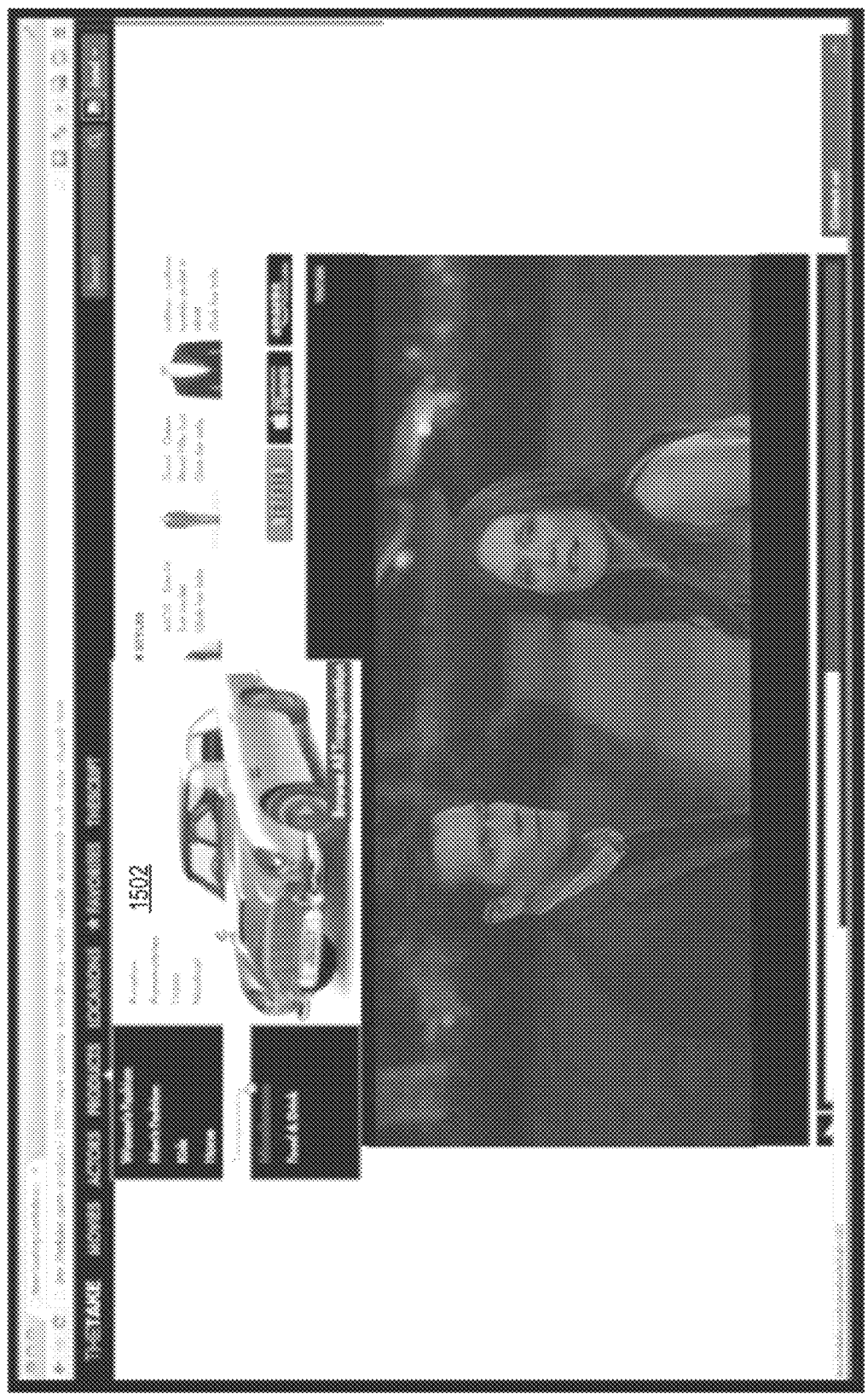
Figure 16:
Figure 17:
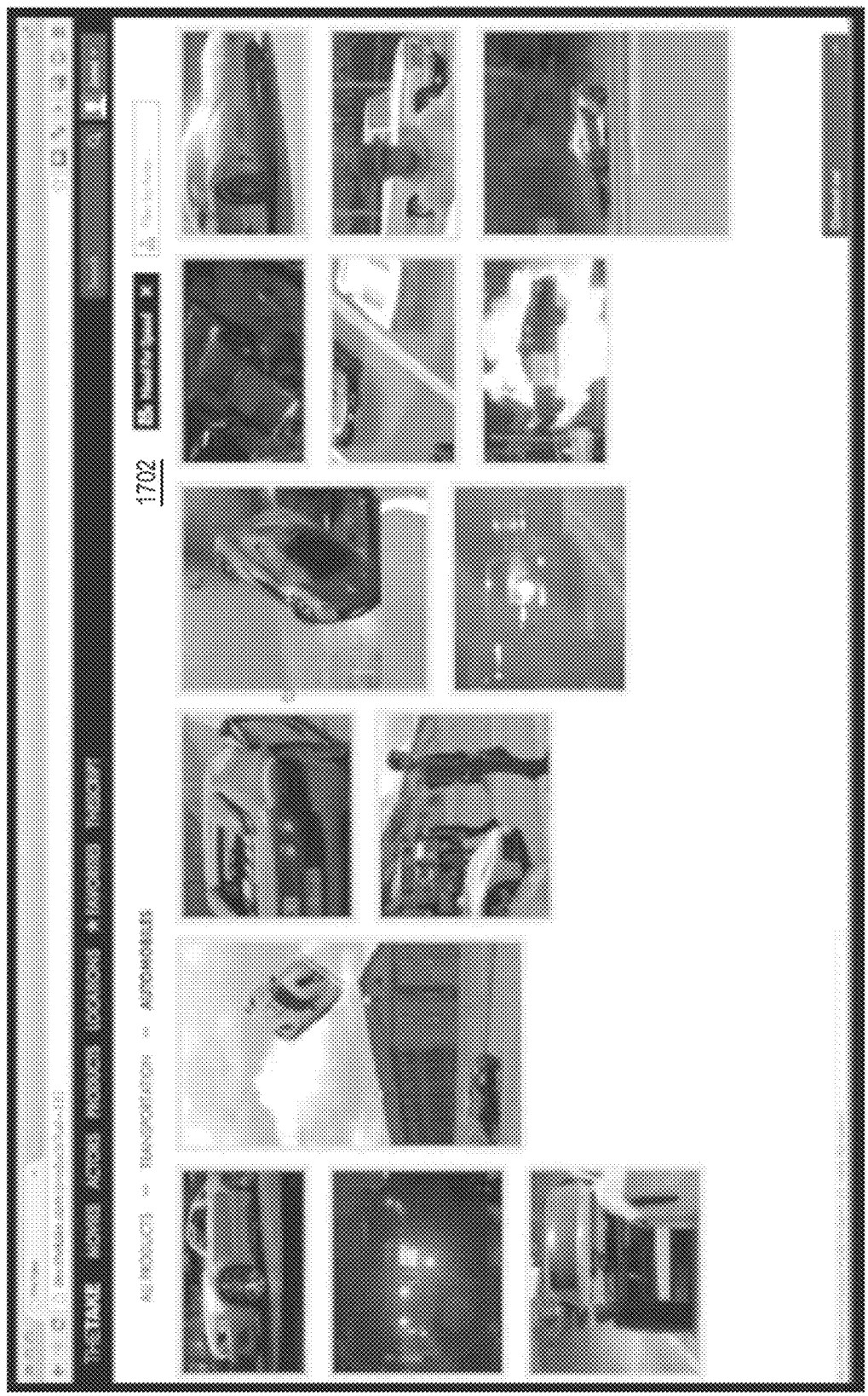

Regarding FIG. 15, in some implementations, the user may be able to search by product and/or service 1502, and/or the like. In some implementations the user may be able to search through product and/or service subcategories and/or the like via a drop-down menu, and/or the like, and may also be able to search by price, size, color, and/or like product and/or service filters. Regarding FIG. 16, in some implementations once the search has been completed the user may be able to see the categories and/or subcategories being searched 1602, as well as view a graphical and/or textual list of search results related to the product and/or service being searched for. In some implementations the user may further refine the search results via searching for a particular product and/or service, searching within a particular media source 1604, media genre, media type, and/or the like, searching based on actors within particular media sources 1606, and/or the like. Regarding FIG. 17, in some implementations a user may be able to view and/or remove filters (e.g., by media source, by actor, by media type, and/or the like) via a filter indicator 1702.

Figure 18:
Figure 19:
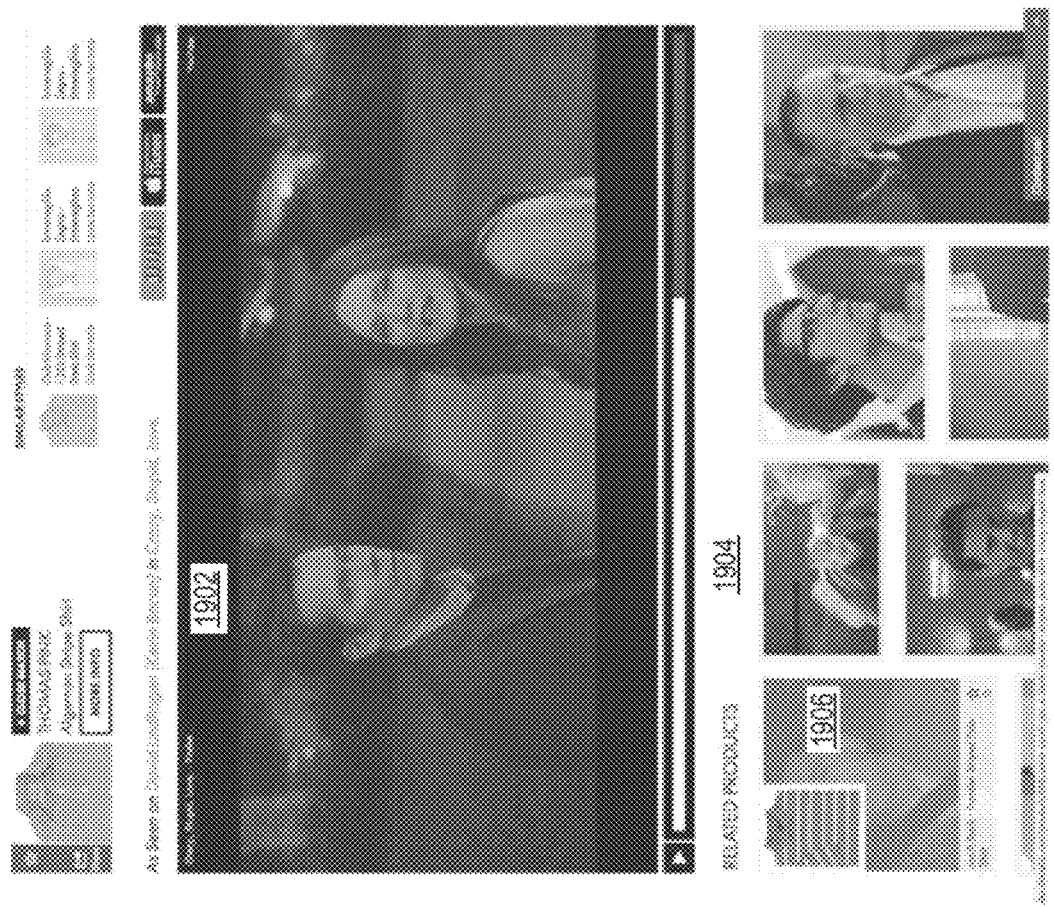
Figure 20:

Regarding FIG. 18, in some implementations, the user may be able to "product-surf," e.g., may be able to move through a plurality of media sources and/or media components via searching and/or selecting multiple products and/or services within a media source and/or related media sources. In some implementations, for example, a user watching a first media source may be able to look at a product 1802 within that particular media source. Regarding FIG. 19, in some implementations, clicking on the product may redirect the user to a portion of the media source which shows the item 1902, and/or another media source and/or the like which shows the product selected. In some implementations the user may also see a section below the media source 1904 which may show related products within related media components and/or media sources (for example, in some implementations the DMPSP may display other products shown within the media source, and/or may show other media sources which contain the same and/or similar products. In some implementations the user May hover 1906 over one of the displayed media sources to view the related product, product information, and/or the like. In some implementations, regarding FIG. 20, selecting the product within the related products section may redirect the user to a new media source, media component, and/or the like 2002 which may contain the selected product. In some implementations the process may be repeated as often as the user would like.

Figure 21:

Regarding FIG. 21, the DMPSP user interface 2102 may display a media clip and/or frame image of a trending product, actor, and/or media source 2104, and may also allow the user to select product tags from displayed media clip and/or frame. The DMPSP may also display featured categories of products 2106 for the user to review, location categories, a list of trending products and/or locations, and/or like aggregated lists of products and/or locations stored on the DMPSP.

DMPSP Controller

Figure 22:
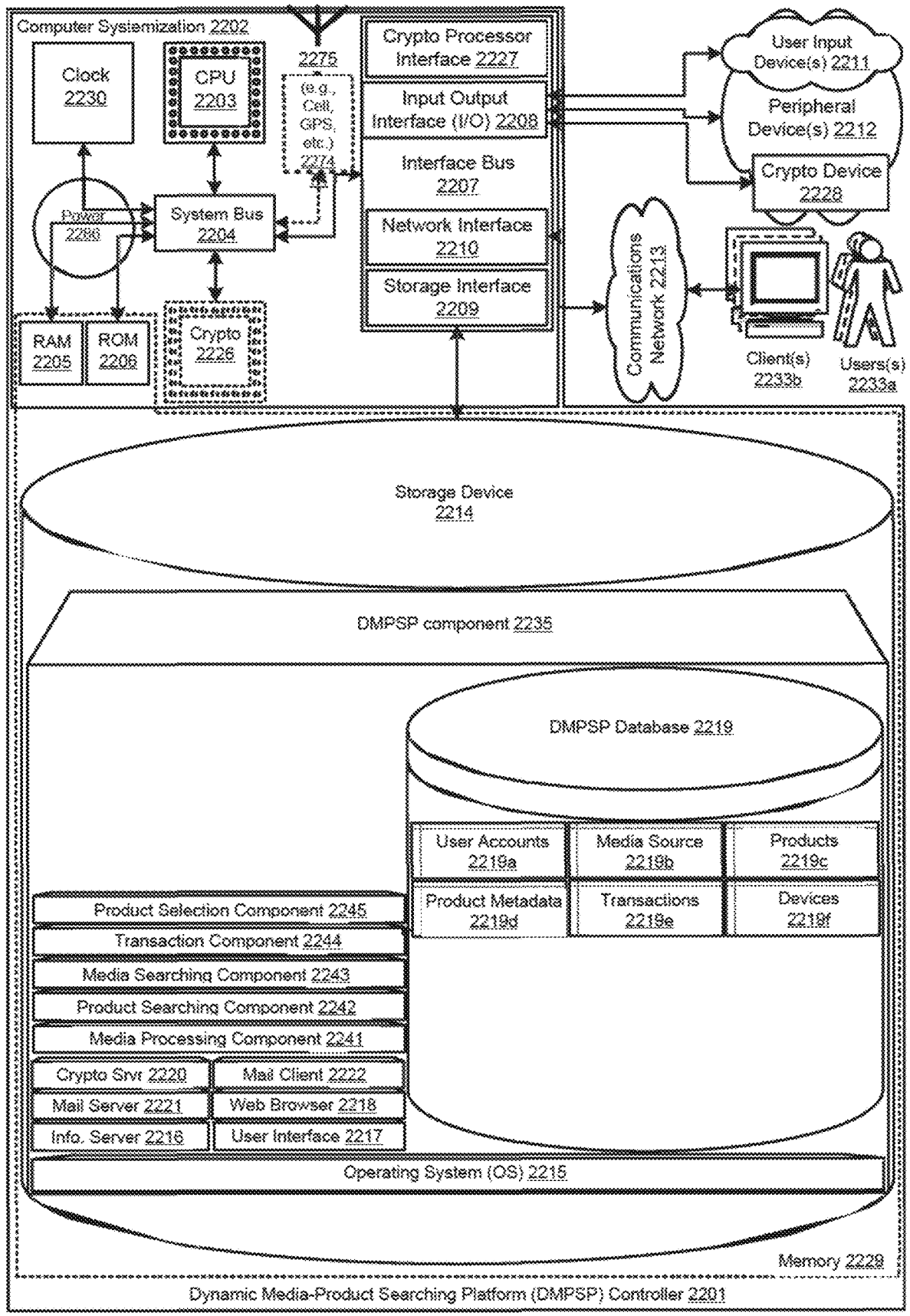
FIG. 22 shows a block diagram illustrating embodiments of a DMPSP controller.

FIG. 22 shows a block diagram illustrating embodiments of a DMPSP controller. In this embodiment, the DMPSP controller 2201 may serve to aggregate, process, store, search, serve, identify, instruct, generate, match, and/or facilitate interactions with a computer through media and transaction technologies, and/or other related data.

Typically, users, which may be people and/or other systems, may engage information technology systems (e.g., computers) to facilitate information processing. In turn, computers employ processors to process information; such processors 2203, May be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data May be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DMPSP controller 2201 may be connected to and/or communicate with entities such as, but not limited to: one or more users from user input devices 2211; peripheral devices 2212; an optional cryptographic processor device 2228; and/or a communications network 2213.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DMPSP controller 2201 may be based on computer systems that may comprise, but are not limited to, components such as: a computer systemization 2202 connected to memory 2229.

Computer Systemization

A computer systemization 2202 may comprise a clock 2230, central processing unit ("CPU(s)" and/or "processor (s)" (these terms are used interchangeable throughout the disclosure unless noted to the contrary)) 2203, a memory 2229 (e.g., a read only memory (ROM) 2206, a random access memory (RAM) 2205, etc.), and/or an interface bus 2207, and most frequently, although not necessarily, are all interconnected and/or communicating through a system bus 2204 on one or more (mother) board(s) 2202 having conductive and/or otherwise transportive circuit pathways through which instructions (e.g., binary encoded signals) may travel to effectuate communications, operations, storage, etc. The computer systemization may be connected to a power source 2286; e.g., optionally the power source may be internal. Optionally, a cryptographic processor 2226 and/or transceivers (e.g., ICs) 2274 may be connected to the system bus. In another embodiment, the cryptographic processor and/or transceivers may be connected as either internal and/or external peripheral devices 2212 via the interface bus I/O. In turn, the transceivers may be connected to antenna(s) 2275, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing DMPSP controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2229 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DMPSP controller and beyond through various interfaces. Should processing requirements dictate a greater amount speed and/or capacity, distributed processors (e.g., Distributed DMPSP), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DMPSP May be achieved by implementing a microcontroller such as CAST's R8051XC2 microcontroller; Intel's MCS 51 (i.e., 8051 microcontroller); and/or the like. Also, to implement certain features of the DMPSP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DMPSP component collection (distributed or otherwise) and/or features may be implemented via the microprocessor and/or via embedded components; e.g., via ASIC, coprocessor, DSP, FPGA, and/or the like. Alternately, some implementations of the DMPSP may be implemented with embedded components that are configured and used to achieve a variety of features or signal processing.

Depending on the particular implementation, the embedded components may include software solutions, hardware solutions, and/or some combination of both hardware/software solutions. For example, DMPSP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DMPSP features. A hierarchy of programmable interconnects allow logic blocks to be interconnected as needed by the DMPSP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DMPSP may be developed on regular FPGAs and then migrated into a fixed version that more resembles ASIC implementations. Alternate or coordinating implementations may migrate DMPSP controller features to a final ASIC instead of or in addition to FPGAs. Depending on the implementation all of the aforementioned embedded components and microprocessors may be considered the "CPU" and/or "processor" for the DMPSP.

Power Source

The power source 2286 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell May capture photonic energy. The power cell 2286 is connected to at least one of the interconnected subsequent components of the DMPSP thereby providing an electric current to all subsequent components. In one example, the power source 2286 is connected to the system bus component 2204. In an alternative embodiment, an outside power source 2286 is provided through a connection across the I/O 2208 interface. For example, a USB and/or IEEE 1394 connection carries both data and power across the connection and is therefore a suitable source of power.

Interface Adapters

Interface bus(ses) 2207 may accept, connect, and/or communicate to a number of interface adapters, conventionally although not necessarily in the form of adapter cards, such as but not limited to: input output interfaces (I/O) 2208, storage interfaces 2209, network interfaces 2210, and/or the like. Optionally, cryptographic processor interfaces 2227 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E) ISA), Micro Channel Architecture (MCA), NuBus, Peripheral Component Interconnect (Extended) (PCI (X)), PCI Express, Personal Computer Memory Card International Association (PCMCIA), and/or the like.

Storage interfaces 2209 may accept, communicate, and/or connect to a number of storage devices such as, but not limited to: storage devices 2214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2210 may accept, communicate, and/or connect to a communications network 2213. Through a communications network 2213, the DMPSP controller is accessible through remote clients 2233b (e.g., computers with web browsers) by users 2233a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DMPSP), architectures may similarly be employed to pool, load balance, and/or otherwise increase the communicative bandwidth required by the DMPSP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2210 may be used to engage with various communications network types 2213. For example, multiple network interfaces may be employed to allow for the communication over broadcast, multicast, and/or unicast networks.

Input Output interfaces (I/O) 2208 may accept, communicate, and/or connect to user input devices 2211, peripheral devices 2212, cryptographic processor devices 2228, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device May include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2211 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2212 may be connected and/or communicate to I/O and/or other facilities of the like such as network interfaces, storage interfaces, directly to the interface bus, system bus, the CPU, and/or the like. Peripheral devices may be external, internal and/or part of the DMPSP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DMPSP controller may be embodied as an embedded, dedicated, and/or monitor-less (i.e., headless) device, wherein access would be provided over a network interface connection.

Cryptographic units such as, but not limited to, microcontrollers, processors 2226, interfaces 2227, and/or devices 2228 may be attached, and/or communicate with the DMPSP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 2229. However, memory is a fungible technology and resource, thus, any number of memory embodiments may be employed in lieu of or in concert with one another. It is to be understood that the DMPSP controller and/or a computer systemization may employ various forms of memory 2229. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2229 will include ROM 2206, RAM 2205, and a storage device 2214. A storage device 2214 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2229 may contain a collection of program and/or database components and/or data such as, but not limited to: operating system component(s) 2215 (operating system); information server component(s) 2216 (information server); user interface component(s) 2217 (user interface); Web browser component(s) 2218 (Web browser); database(s) 2219; mail server component(s) 2221; mail client component(s) 2222; cryptographic server component(s) 2220 (cryptographic server); the DMPSP component 2235 component(s) 2235, including components 2241-2245; and/or the like (i.e., collectively a component collection). These components may be stored and accessed from the storage devices and/or from storage devices accessible through an interface bus. Although non-conventional program components such as those in the component collection, typically, are stored in a local storage device 2214, they may also be loaded and/or stored in memory such as: peripheral devices, RAM, remote storage facilities through a communications network, ROM, various forms of memory, and/or the like.

Operating System

The operating system component 2215 is an executable program component facilitating the operation of the DMPSP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system May provide communications protocols that allow the DMPSP controller to communicate with other entities through a communications network 2213. Various communication protocols may be used by the DMPSP controller as a subcarrier transport mechanism for interaction, such as, but not limited to: multicast, TCP/IP, UDP, unicast, and/or the like.
Information Server An information server component 2216 is a stored program component that is executed by a CPU. The information server may be a conventional Internet information server such as, but not limited to Apache Software Foundation's Apache, Microsoft's Internet Information Server, and/or the like. The information server May allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers and allows for the manipulated generation of the Web pages through interaction with other program components. After a Domain Name System (DNS) resolution portion of an HTTP request is resolved to a particular information server, the information server resolves requests for information at specified locations on the DMPSP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DMPSP database 2219, operating systems, other program components, user interfaces, Web browsers, and/or the like.

Access to the DMPSP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DMPSP. In one embodiment, the information server would provide a Web form accessible by a Web browser. Entries made into supplied fields in the Web form are tagged as having been entered into the particular fields and parsed as such. The entered terms are then passed along with the field tags, which act to instruct the parser to generate queries directed to appropriate tables and/or fields. In one embodiment, the parser May generate queries in standard SQL by instantiating a search string with the proper join/select commands based on the tagged text entries, wherein the resulting command is provided over the bridge mechanism to the DMPSP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.
User Interface Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D) HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2217 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.
Web Browser A Web browser component 2218 is a stored program component that is executed by a CPU. The Web browser may be a conventional hypertext viewing application such as Microsoft Internet Explorer or Netscape Navigator. Secure Web browsing may be supplied with 128 bit (or greater)

encryption by way of HTTPS, SSL, and/or the like. Web browsers allowing for the execution of program components through facilities such as ActiveX, AJAX, (D) HTML, FLASH, Java, JavaScript, web browser plug-in APIs (e.g., FireFox, Safari Plug-in, and/or the like APIs), and/or the like. Web browsers and like information access tools may be integrated into PDAS, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DMPSP enabled nodes. The combined application may be nugatory on systems employing standard Web browsers.

Mail Server

A mail server component 2221 is a stored program component that is executed by a CPU 2203. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DMPSP.

Access to the DMPSP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2222 is a stored program component that is executed by a CPU 2203. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2220 is a stored program component that is executed by a CPU 2203, cryptographic processor 2226, cryptographic processor interface 2227, cryptographic processor device 2228, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DMPSP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the DMPSP component to engage in secure transactions if so desired. The cryptographic component facilitates the secure accessing of resources on the DMPSP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DMPSP Database

The DMPSP database component 2219 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DMPSP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DMPSP database is implemented as a data-structure, the use of the DMPSP database 2219 may be integrated into another component such as the DMPSP component 2235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2219 includes several tables 2219*a-f*. A user account table 2219*a* includes fields such as, but not limited to: user_ID, user_name, user_address, user_email, user_fname, user_lname, user_payment_info, user_date_added, user_favorites, user_devices, and/or the like. The user account table may support and/or track multiple user accounts on a DMPSP. A media source table 2219*b* includes fields such as, but not limited to: media_ID, media_name, media_desc, media_type, media_length, media_content, media_metadata, media_products, media_services, media_date_added, media_scenes, and/or the like. The media source table may support and/or track multiple media sources on a DMPSP. A products table 2219*c* includes fields such as, but not limited to: product_ID, product_name, product_type, product_media_ID, product_desc, product_price, product_similar, product_date_added, product_link, product_SKU, product_merchant_identifier, product_keywords, and/or the like. The products table may support and/or track multiple products and/or services on a DMPSP. A product metadata table 2219*d* includes fields such as, but not limited to: mt_ID, mt_date_created, mt_media_ID, mt_product_ID, mt_timestamp, mt_tag_coord, mt_tag_frame, mt_tag_prod_match, mt_tag_submittor, mt_prod_type, mt_location, and/or the like. The product metadata table may support and/or track metadata for products and/or services on a DMPSP. A transactions table 2219*e* includes fields such as, but not limited to: transaction_ID, transaction_type, transaction_user, transaction_amount, transaction_date, transaction_log, and/or the like. The transactions table may support and/or track multiple transactions on a DMPSP. A device table 2219*f* includes fields such as, but not limited to: device_ID, device_name, device_model, device_make, device_serial, device_user_ID, device_OS, device_ver, device_screen, and/or the like. The device table may support and/or track multiple devices on a DMPSP.

In one embodiment, the DMPSP database may interact with other database systems. For example, employing a distributed database system, queries and data access by search DMPSP component may treat the combination of the DMPSP database, an integrated data security layer database as a single database entity.

In one embodiment, user programs may contain various user interface primitives, which may serve to update the DMPSP. Also, various accounts may require custom database tables depending upon the environments and the types of clients the DMPSP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2219*a-f*. The DMPSP may be configured to keep track of various settings, inputs, and parameters via database controllers.

The DMPSP database may communicate to and/or with other components in a component collection, including itself, and/or facilities of the like. Most frequently, the DMPSP database communicates with the DMPSP component, other program components, and/or the like. The database may contain, retain, and provide information regarding other nodes and data.

The DMPSPs

The DMPSP component 2235 is a stored program component that is executed by a CPU. In one embodiment, the DMPSP component incorporates any and/or all combinations of the aspects of the DMPSP that was discussed in the previous figures. As such, the DMPSP affects accessing, obtaining and the provision of information, services, transactions, and/or the like across various communications networks. The features and embodiments of the DMPSP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DMPSP's features and facilities, and in many cases reduce the costs, energy consumption/requirements, and extend the life of DMPSP's underlying infrastructure; this has the added benefit of making the DMPSP more reliable. Similarly, many of the features and mechanisms are designed to be easier for users to use and access, thereby broadening the audience that may enjoy/employ and exploit the feature sets of the DMPSP; such ease of use also helps to increase the reliability of the DMPSP.

In addition, the feature sets include heightened security as noted via the Cryptographic components 2220, 2226, 2228 and throughout, making access to the features and data more reliable and secure.

The DMPSP transforms media source 2219*b*, product 2219*c*, and user inputs via DMPSP's Media Processing 2241, Product Searching 2242, Media Searching 2243, Transaction 2244, and Product Selection 2245 components into product metadata 2219*d* and transactions 2219*e* outputs.

The DMPSP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D) HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DMPSP server employs a cryptographic server to encrypt and decrypt communications. The DMPSP component may communicate to and/or with other components in a component collection, including itself, and/or facilities of the like. Most frequently, the DMPSP component communicates with the DMPSP database, operating systems, other program components, and/or the like. The DMPSP may contain, communicate, generate, obtain, and/or provide program component, system, user, and/or data communications, requests, and/or responses.

Distributed DMPSPs

The structure and/or operation of any of the DMPSP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DMPSP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DMPSP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header ('Content-Type: text/plain');
// set ip address and port to listen to for incoming data
$address='192.168.0.100';
$port=255;
// create a server-side SSL socket, listen for/accept incoming communication
$sock=socket create (AF_INET, SOCK STREAM, 0);
socket_bind($sock, $address, $port) or die ('Could not bind to address');
socket_listen($sock);
$client=socket accept ($sock);
```

```
// read input data from client device in 1024 byte blocks
    until end of message do {
    $input=" ";
    $input=socket_read($client, 1024);
    $data.=$input;
} while ($input!=" ");
// parse data to extract variables
$obj=json_decode($data, true);
//store input data in a database
mysql_connect("201.408.185.132",$DBserver,$password); //access database server
mysql_select("CLIENT DB.SQL"); // select database to append
mysql_query("INSERT INTO UserTable (transmission) VALUES ($data)"); // add data to UserTable table in a CLIENT database
mysql_close("CLIENT_DB. SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for dynamic media-product searching platform apparatuses, methods and systems (including the Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that May execute asynchronously, concurrently, in parallel, simultaneously, synchronously, and/or the like are contemplated by the disclosure. As such, some of these features May be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DMPSP individual and/or enterprise user, database configuration and/or relational model, data type, data transmission and/or network framework, syntax structure, and/or the like, various embodiments of the DMPSP, may be implemented that enable a great deal of flexibility and customization. While various embodiments and discussions of the DMPSP have included searching for products within film clips, it is to be understood that the embodiments described herein may be readily configured and/or customized for a wide variety of other applications and/or implementations, such as searching for products and/or services in television show clips, magazines, advertisements, and/or the like.

The invention claimed is:

1. A method of responding to a request from a user watching a media file on a television for metadata relating to a product appearing in the media file, the method comprising:

splitting, by a processor, the media file into a plurality of frames;

analyzing, by the processor, at least a subset of frames in the plurality of frames;

identifying the product depicted in the media file;

storing, in a database communicably coupled to the processor, the metadata relating to the product;

generating an overlay schedule relating the metadata to the product;

receiving the request from the user for the metadata, the request matching a frame in the plurality of frames to the overlay schedule;

retrieving the overlay schedule in response to the request from the user;

obtaining the metadata based on the overlay schedule and the frame identified in the request;

in response to the request from the user, searching for at least one other product based on a category associated with the product;

retrieving product information for the at least one other product; and providing the metadata and the product information in response to the request while the media file is playing on the television.

2. The method of claim 1, wherein identifying the product further includes:

identifying, by the processor, the product in a first frame in at least the subset of frames based on the analysis; and tagging, by the processor, the first frame with a tag based on the identification.

3. The method of claim 2, further comprising:

transmitting, from the processor, the tag to an administrator for verification.

4. The method of claim 1, wherein identifying the product includes:

tagging, by an administrator, the product.

5. The method of claim 4, wherein the product occurs in a first frame in at least the subset of frames, the method further comprising:

identifying, by the processor, the product in a second frame subsequent to the first frame in at least the subset of frames; and tagging, by the processor, the product in the second frame.

6. The method of claim 5, further comprising:

identifying, by the processor, the product in another media file, the other media file being displayed on the television subsequent to the media file.

7. The method of claim 1, wherein generating the overlay schedule includes associating frame numbers and timestamps with respective frames in the plurality of frames.

8. The method of claim 1, wherein receiving the request and providing the metadata occur via an application programming interface (API), the API enabling presentation of the metadata to the user on the television.

9. The method of claim 1, wherein providing the metadata comprises:

transmitting the metadata to a mobile device different than the television; and displaying the metadata to the user via the mobile device.

10. The method of claim 1, wherein searching for at least one other product comprises identifying a product not appearing in the media file.

11. The method of claim 1, wherein searching for the at least one other product comprises identifying a product appearing in a different media file.

12. The method of claim 1, wherein searching for the at least one other product comprises generating a list of similar products.

13. The method of claim 1, wherein searching for the at least one other product comprises submitting keywords to an application programming interface configured to return products matching the keywords.

14. The method of claim 1, wherein providing the metadata and the product information comprises indicating that the product is in stock at a particular store.

15. The method of claim 1, wherein providing the metadata and the product information includes indicating that the product is in stock at a particular store.

16. The method of claim 1, further comprising:

receiving from the user an indication of interest in purchasing the product.

17. The method of claim 16, further comprising:

processing a transaction purchasing the product with payment data stored in the database.

18. The method of claim 1, further comprising:

displaying at least one additional media source associated with the category.

19. The method of claim 1, wherein the overlay schedule defines when to display product overlays and/or tags based on at least one of a frame number or a timestamp.

20. The method of claim 1, wherein the overlay schedule further coordinates information for tags in each frame number.

* * * * *